United States Patent
Iannello et al.

(10) Patent No.: US 9,583,991 B2
(45) Date of Patent: Feb. 28, 2017

(54) SYSTEMS, DEVICES, AND/OR METHODS FOR MANAGING MAGNETIC BEARINGS

(75) Inventors: Victor Iannello, Roanoke, VA (US); Christopher Sortore, Roanoake, VA (US); Robert Jett Field, Fincastle, VA (US); Kirk Treubert, Roanoke, VA (US)

(73) Assignee: SYNCHRONY, INC.

( * ) Notice: Subject to any disclaimer, the term of this patent is extended or adjusted under 35 U.S.C. 154(b) by 678 days.

(21) Appl. No.: 12/820,698

(22) Filed: Jun. 22, 2010

(65) Prior Publication Data

US 2010/0327687 A1    Dec. 30, 2010

Related U.S. Application Data

(60) Provisional application No. 61/219,970, filed on Jun. 24, 2009.

(51) Int. Cl.
*H02K 7/09* (2006.01)
*F16C 32/04* (2006.01)

(52) U.S. Cl.
CPC ........... *H02K 7/09* (2013.01); *F16C 32/0442* (2013.01)

(58) Field of Classification Search
CPC ....................................................... H02K 7/09
USPC ......................................... 310/90.5; 318/632
IPC ....................................................... H02K 7/09
See application file for complete search history.

(56) References Cited

U.S. PATENT DOCUMENTS

| | | |
|---|---|---|
| 2,221,983 A | 11/1940 | Mayer |
| 2,408,641 A | 10/1946 | Hitchcock |
| 2,877,366 A | 3/1959 | Carr |
| 3,146,300 A | 8/1964 | Beckius |
| 3,221,194 A | 11/1965 | Blackburn |
| 3,715,659 A | 2/1973 | Abnett |
| 3,777,194 A | 12/1973 | Schaefer |
| 4,080,012 A | 3/1978 | Boden |
| 4,112,751 A | 9/1978 | Grunbaum |
| 4,117,360 A | 9/1978 | Richter |
| 4,144,469 A | 3/1979 | Miyashita |
| 4,177,360 A | 12/1979 | Fujimoto |
| 4,199,952 A | 4/1980 | Berg |
| 4,245,869 A | 1/1981 | Scheffer |
| 4,270,936 A | 6/1981 | Mann |
| 4,286,010 A | 8/1981 | Staley |

(Continued)

FOREIGN PATENT DOCUMENTS

| | | |
|---|---|---|
| CN | 2706952 | 6/2005 |
| CN | 101438358 | 5/2009 |

(Continued)

OTHER PUBLICATIONS

Machine Translation, JP 2002325476 A, Motor Device, Nov. 8, 2002.*

(Continued)

*Primary Examiner* — Thomas Truong
(74) *Attorney, Agent, or Firm* — Edmonds & Nolte, PC

(57) ABSTRACT

A machine is provided including magnetic radial bearings to magnetically levitate a rotating shaft. Each of the magnetic radial bearings includes stator magnet groups. Each of the stator magnet groups includes stator magnets. Each of the stator magnet groups is operatively configured to fully support the rotating shaft independently of each other stator magnet group of the stator magnet groups so that the machine continues to operate with the failure of one or more components of the machine.

20 Claims, 11 Drawing Sheets

(56) References Cited

U.S. PATENT DOCUMENTS

| | | | |
|---|---|---|---|
| 4,353,602 A | 10/1982 | Habermann | |
| 4,389,849 A | 6/1983 | Beggs | |
| 4,618,792 A | 10/1986 | Yates | |
| 4,650,132 A | 3/1987 | Graf | |
| 4,683,391 A * | 7/1987 | Higuchi | 310/90.5 |
| 4,686,404 A * | 8/1987 | Nakazeki et al. | 310/90.5 |
| 4,703,662 A | 11/1987 | Gabelli | |
| 4,742,258 A | 5/1988 | Earle | |
| 4,893,040 A | 1/1990 | Turner | |
| 4,896,088 A | 1/1990 | Jahns | |
| 4,920,291 A | 4/1990 | McSparran | |
| 4,962,085 A | 10/1990 | deBarbadillo | |
| 4,962,089 A | 10/1990 | Boden | |
| 4,982,126 A | 1/1991 | Jolivet | |
| 5,013,987 A | 5/1991 | Wakui | |
| 5,021,698 A | 6/1991 | Pullen | |
| 5,051,637 A * | 9/1991 | Harris et al. | 310/90.5 |
| 5,095,237 A * | 3/1992 | Bardas et al. | 310/90.5 |
| 5,136,854 A | 8/1992 | Abdelmalek | |
| 5,153,475 A | 10/1992 | McSparran | |
| 5,250,865 A | 10/1993 | Meeks | |
| 5,256,638 A | 10/1993 | Weinberger | |
| 5,291,735 A | 3/1994 | Kesten | |
| 5,300,841 A | 4/1994 | Preston | |
| 5,300,842 A | 4/1994 | Lyons | |
| 5,300,843 A | 4/1994 | Lyons | |
| 5,327,069 A | 7/1994 | Radun | |
| 5,347,190 A | 9/1994 | Lewis | |
| 5,355,041 A | 10/1994 | Shirao | |
| 5,355,042 A | 10/1994 | Lewis | |
| 5,400,256 A * | 3/1995 | Beale et al. | 701/124 |
| 5,434,427 A | 7/1995 | Crane | |
| 5,455,472 A * | 10/1995 | Weiss et al. | 310/90.5 |
| 5,469,007 A | 11/1995 | Toyama | |
| 5,530,306 A | 6/1996 | Ueyama | |
| 5,539,323 A | 7/1996 | Davis | |
| 5,543,673 A * | 8/1996 | Katsumata et al. | 310/90.5 |
| 5,554,583 A | 9/1996 | Hull | |
| 5,565,722 A | 10/1996 | Rubner | |
| 5,578,880 A * | 11/1996 | Lyons et al. | 310/90.5 |
| 5,682,071 A | 10/1997 | Buhler | |
| 5,705,918 A | 1/1998 | Davis | |
| 5,729,066 A | 3/1998 | Soong | |
| 5,739,609 A | 4/1998 | Ueyama | |
| 5,743,654 A | 4/1998 | Ide | |
| 5,757,196 A | 5/1998 | Wetzel | |
| 5,760,510 A | 6/1998 | Nomura | |
| 5,761,971 A | 6/1998 | Hori | |
| 5,808,392 A | 9/1998 | Sakai | |
| 5,811,905 A | 9/1998 | Tang | |
| 5,857,348 A | 1/1999 | Conry | |
| 5,866,964 A | 2/1999 | Li | |
| 5,872,507 A | 2/1999 | Weber | |
| 5,878,584 A | 3/1999 | Sasaki | |
| 5,880,549 A | 3/1999 | Chiba | |
| 5,894,210 A | 4/1999 | Brown | |
| 5,923,142 A | 7/1999 | Li | |
| 5,936,370 A | 8/1999 | Fukao | |
| 5,939,807 A | 8/1999 | Patyk | |
| 5,955,811 A | 9/1999 | Chiba | |
| 5,962,942 A | 10/1999 | Pullen | |
| 5,973,468 A | 10/1999 | Yamauchi | |
| 6,014,002 A | 1/2000 | Guinet | |
| 6,040,650 A | 3/2000 | Rao | |
| 6,050,083 A | 4/2000 | Meckler | |
| 6,104,111 A | 8/2000 | Pullen | |
| 6,147,425 A | 11/2000 | Ueyama | |
| 6,148,634 A | 11/2000 | Sherwood | |
| 6,181,092 B1 | 1/2001 | Turner | |
| 6,184,640 B1 | 2/2001 | Kawashima | |
| 6,194,800 B1 | 2/2001 | Maruyama | |
| 6,195,869 B1 | 3/2001 | Pullen | |
| 6,198,183 B1 | 3/2001 | Baeumel | |
| 6,198,803 B1 | 3/2001 | Osama | |
| 6,208,051 B1 | 3/2001 | Ando | |
| 6,225,767 B1 * | 5/2001 | Lovett et al. | 318/114 |
| 6,233,938 B1 | 5/2001 | Nicodemus | |
| 6,253,563 B1 | 7/2001 | Ewert | |
| 6,304,011 B1 | 10/2001 | Pullen | |
| 6,309,188 B1 | 10/2001 | Danner | |
| 6,326,712 B1 | 12/2001 | Nakazawa | |
| 6,346,757 B1 | 2/2002 | Shinozaki | |
| 6,351,048 B1 * | 2/2002 | Schob et al. | 310/90.5 |
| 6,362,549 B1 | 3/2002 | Shi | |
| 6,380,652 B1 | 4/2002 | Ueyama | |
| 6,388,981 B1 | 5/2002 | Sohn | |
| 6,404,097 B1 | 6/2002 | Pullen | |
| 6,424,069 B1 | 7/2002 | Pullen | |
| 6,441,580 B2 | 8/2002 | Marcinkiewicz | |
| 6,455,966 B1 | 9/2002 | Barada | |
| 6,469,487 B2 | 10/2002 | Ewert | |
| 6,472,787 B1 | 10/2002 | Kameno | |
| 6,483,212 B1 | 11/2002 | Mimura | |
| 6,486,683 B1 | 11/2002 | Nussbaum | |
| 6,489,701 B1 | 12/2002 | Gamble | |
| 6,515,387 B1 | 2/2003 | Shinozaki | |
| 6,519,273 B2 | 2/2003 | Sekiguchi | |
| 6,559,568 B2 | 5/2003 | Maejima | |
| 6,570,285 B2 | 5/2003 | Shinozaki | |
| 6,590,366 B1 | 7/2003 | Browning | |
| 6,617,733 B1 | 9/2003 | Yamauchi | |
| 6,617,734 B2 | 9/2003 | Taniguchi | |
| 6,657,345 B2 | 12/2003 | Shinozaki | |
| 6,657,348 B2 | 12/2003 | Quin | |
| 6,666,134 B2 | 12/2003 | Gusching | |
| 6,735,945 B1 | 5/2004 | Hall | |
| 6,770,992 B2 | 8/2004 | Yamauchi | |
| 6,777,841 B2 | 8/2004 | Steinmeyer | |
| 6,798,097 B2 | 9/2004 | Pullen | |
| 6,809,449 B2 | 10/2004 | Shinozaki | |
| 6,809,450 B1 | 10/2004 | Morrison | |
| 6,822,355 B2 | 11/2004 | Karrelmeyer | |
| 6,831,384 B2 | 12/2004 | Ries | |
| 6,849,979 B2 | 2/2005 | Brunet | |
| 6,873,075 B2 | 3/2005 | Taira | |
| 6,892,522 B2 | 5/2005 | Brasz | |
| 6,912,773 B2 | 7/2005 | Pullen | |
| 6,927,550 B2 | 8/2005 | Tamisier | |
| 6,949,853 B2 | 9/2005 | Kawashima | |
| 6,984,907 B2 | 1/2006 | Barada | |
| 6,997,010 B2 | 2/2006 | Suzuki | |
| 7,002,273 B2 | 2/2006 | Schippl | |
| 7,005,864 B2 | 2/2006 | Iannello | |
| 7,013,644 B2 | 3/2006 | Radcliff | |
| 7,017,357 B2 | 3/2006 | Brasz | |
| 7,023,118 B1 | 4/2006 | Morrison | |
| 7,053,511 B2 | 5/2006 | Taniguchi | |
| 7,053,582 B2 | 5/2006 | Ueyama | |
| 7,065,979 B2 | 6/2006 | Arshansky | |
| 7,078,839 B2 * | 7/2006 | Kim | 310/90.5 |
| 7,091,641 B2 | 8/2006 | Kawashima | |
| 7,138,738 B2 | 11/2006 | Shimada | |
| 7,156,627 B2 | 1/2007 | Lenderink | |
| 7,235,907 B2 | 6/2007 | Shimada | |
| 7,268,453 B2 | 9/2007 | Shimada | |
| 7,274,123 B2 | 9/2007 | Shimada | |
| 7,285,887 B2 | 10/2007 | Shimada | |
| 7,288,915 B2 | 10/2007 | Norman | |
| 7,343,663 B2 | 3/2008 | Hodowanec | |
| 7,355,833 B2 | 4/2008 | Kozaki | |
| 7,394,229 B2 | 7/2008 | Lim | |
| 7,436,093 B2 | 10/2008 | Brunet | |
| 7,466,051 B2 | 12/2008 | Miya | |
| 7,471,022 B2 | 12/2008 | Sortore | |
| 7,501,782 B2 | 3/2009 | Buhler | |
| 7,536,869 B2 | 5/2009 | Inaba | |
| 7,545,066 B2 | 6/2009 | Baudelocque | |
| 7,564,670 B2 | 7/2009 | Kozaki | |
| 7,583,000 B2 | 9/2009 | Durham | |
| 7,633,201 B2 | 12/2009 | Buhler | |
| 7,635,937 B2 | 12/2009 | Brunet | |
| 7,679,248 B2 | 3/2010 | Kozaki | |
| 7,687,948 B2 | 3/2010 | Sortore | |
| 7,737,590 B2 | 6/2010 | Oyama | |

(56) References Cited

U.S. PATENT DOCUMENTS

| | | | |
|---|---|---|---|
| 7,932,655 | B2 | 4/2011 | Buhler |
| 7,944,104 | B2 | 5/2011 | Barada |
| 7,977,839 | B2 | 7/2011 | Barada |
| 7,986,070 | B2 | 7/2011 | Baudelocque |
| 8,018,106 | B2 | 9/2011 | Buhler |
| 2001/0024099 | A1 | 9/2001 | Greif |
| 2002/0029897 | A1 | 3/2002 | Younsi |
| 2002/0148225 | A1 | 10/2002 | Lewis |
| 2002/0149331 | A1 | 10/2002 | Marcinkiewicz |
| 2002/0176943 | A1 | 11/2002 | Pereira |
| 2003/0038553 | A1 | 2/2003 | Andres |
| 2003/0132673 | A1 | 7/2003 | Zhou |
| 2004/0046467 | A1 | 3/2004 | Huang |
| 2004/0088992 | A1 | 5/2004 | Brasz |
| 2004/0189132 | A1 | 9/2004 | Horst |
| 2005/0070275 | A1 | 3/2005 | Jeyaseelan |
| 2005/0077793 | A1 | 4/2005 | Garvey |
| 2005/0110363 | A1 | 5/2005 | Hoffmann |
| 2005/0223737 | A1 | 10/2005 | Conry |
| 2006/0026981 | A1 | 2/2006 | Inaba |
| 2006/0243683 | A1 | 11/2006 | Onachilla |
| 2006/0273683 | A1 | 12/2006 | Caprio |
| 2007/0200438 | A1 | 8/2007 | Kaminski |
| 2007/0200440 | A1 | 8/2007 | Kalsi |
| 2007/0273322 | A1 | 11/2007 | Ramu |
| 2008/0045413 | A1 | 2/2008 | Ko |
| 2008/0073993 | A1 | 3/2008 | Sortore |
| 2008/0238234 | A1 | 10/2008 | Saban |
| 2009/0261678 | A1 | 10/2009 | Sortore |
| 2009/0265038 | A1 | 10/2009 | Ramsey |
| 2010/0009833 | A1 | 1/2010 | Ryu |
| 2010/0156402 | A1* | 6/2010 | Straubinger et al. .... 324/207.25 |
| 2010/0237819 | A1* | 9/2010 | Binnard et al. ............... 318/632 |
| 2011/0316376 | A1 | 12/2011 | Sortore |

FOREIGN PATENT DOCUMENTS

| | | | |
|---|---|---|---|
| DE | 2355104 | | 5/1975 |
| EP | 0411697 | | 7/1990 |
| EP | 0693630 | | 1/1996 |
| EP | 0693630 | | 2/1996 |
| EP | 1063753 | | 12/2000 |
| FR | 2574880 | | 6/1986 |
| JP | 09-149572 | | 6/1997 |
| JP | 2002325476 | A * | 11/2002 ............... H02P 5/00 |
| JP | 2002325476 | A | 11/2012 |
| RU | 2241296 | | 11/2004 |
| SU | 1830591 | | 7/1993 |
| WO | WO0035230 | | 6/2000 |
| WO | WO02096146 | | 11/2002 |
| WO | WO2006061671 | | 6/2006 |
| WO | 2007141021 | A2 | 12/2007 |
| WO | WO 2007141021 | A2 * | 12/2007 |
| WO | WO2008039124 | | 4/2008 |
| WO | WO2009140022 | | 11/2009 |
| WO | WO2009146189 | | 12/2009 |
| WO | WO2011005552 | | 1/2011 |
| WO | WO2011163456 | | 12/2011 |

OTHER PUBLICATIONS

Mushi, "Design, Construction and Modeling of a Flexible Rotor Active Magnetic Bearing Test Rig", Nov. 30, 2009, 10 pages, Draft-Proceedings of ASME Turbo Expo 2010: Power for Land, Sea and Air, Jun. 14-18, 2010, Glasgow, UK.
EP 0 693 630—European Search Report dated Oct. 31, 1997.
PCT/SE2006/050348—International Search Report dated Feb. 24, 2007.
PCT/US2007/014090—International Search Report and Written Opinion mailed Aug. 25, 2008.
PCT/US2007/014090—International Preliminary Report on Patentability mailed Dec. 15, 2008.
PCT/US2009/040790—International Search Report and Written Opinion mailed Jun. 9, 2009.
PCT/US2009/040735—International Search Report and Written Opinion mailed Jun. 16, 2009.
PCT/US2009/059481—International Search Report and Written Opinion mailed Sep. 9, 2010.
PCT/US2009/040735—International Preliminary Report on Patentability mailed Oct. 19, 2010.
PCT/US2009/040790—International Preliminary Report on Patentability mailed Oct. 19, 2010.
PCT/US2010/039582—International Search Report and Written Opinion mailed May 31, 2011.
PCT/US2011/041593—International Search Report and Written Opinion mailed Oct. 31, 2011.
PCT/US2010/039582—International Preliminary Report on Patentability dated Jan. 4, 2012.
PCT/US2009/059481—International Preliminary Report on Patentability mailed Apr. 19, 2012.
Mushi, "Design, Construction and Modeling of a Flexible Rotor Active Magnetic Bearing Test Rig" 2009, 10 pages, Draft—Proceedings of ASME Turbo Expo 2010: Power for Land, Sea and Air, Jun. 14-18, 2010, Glasgow, UK.
Garcia, Ferreiro et al., "Diagnosis of Active Magnetic Bearings" [Diagnosis de Cojinetes Magneticos Activos], XXVII Automation Symposium, Year 2001, Sep. 5-7, University of Huelva, Spain (D3).
Boylestad, "Electronic Devices and Circuit Theory, 5th edition," Jan. 1, 1992, 8 pages, Prentice Hall Career & Technology, Englewood Cliffs, New Jersey.
Klyukhin, "Analysis of Eddy Current Distributions in the CMS Magnet Yoke During the Solenoid Discharge", Jun. 2005, 4 pages, IEEE Transactions on Nuclear Science, vol. 52, No. 3.

* cited by examiner

SYSTEMS, DEVICES, AND/OR METHODS FOR MANAGING MAGNETIC BEARINGS

CROSS-REFERENCES TO RELATED APPLICATIONS

This application claims priority to pending U.S. Provisional Patent Application 61/219,970, filed 24 Jun. 2009.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a high performance, fault-tolerant magnetic bearing system that can be robust, compact, and/or highly serviceable. The system can include:

- fault tolerant design incorporating a 3-channel redundant architecture;
- compact design of both the magnetic bearing and the controller;
- position sensors with proven performance, integration, and/or reliability;
- advanced magnetic bearing control processes for increased stability and/or performance;
- robust auxiliary bearing system designed using advanced simulation tools;
- easily maintained and/or accessible auxiliary bearing system; and/or
- clearly defined and/or efficient processes to optimize (tune) bearing control parameters.

Figure 1:
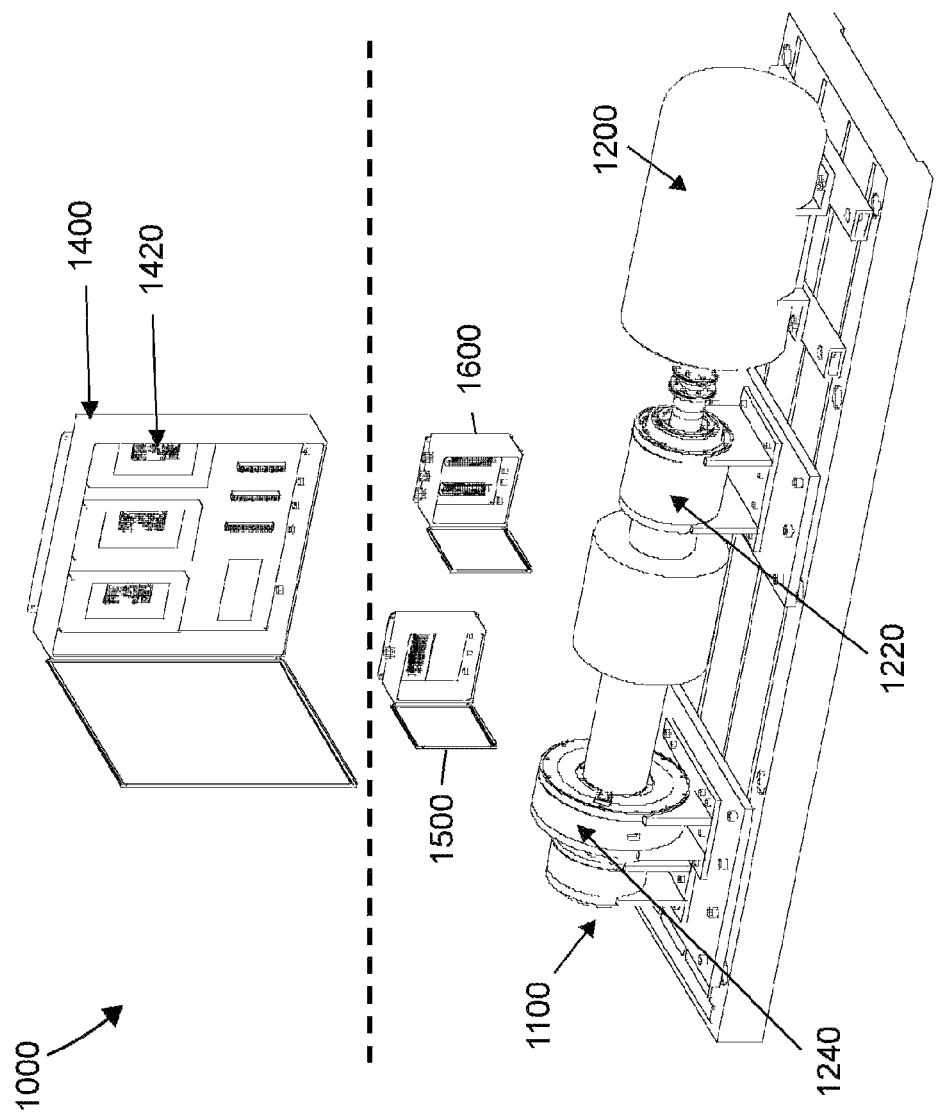
FIG. 1 is a perspective view of an exemplary embodiment of a system.
Figure 2:
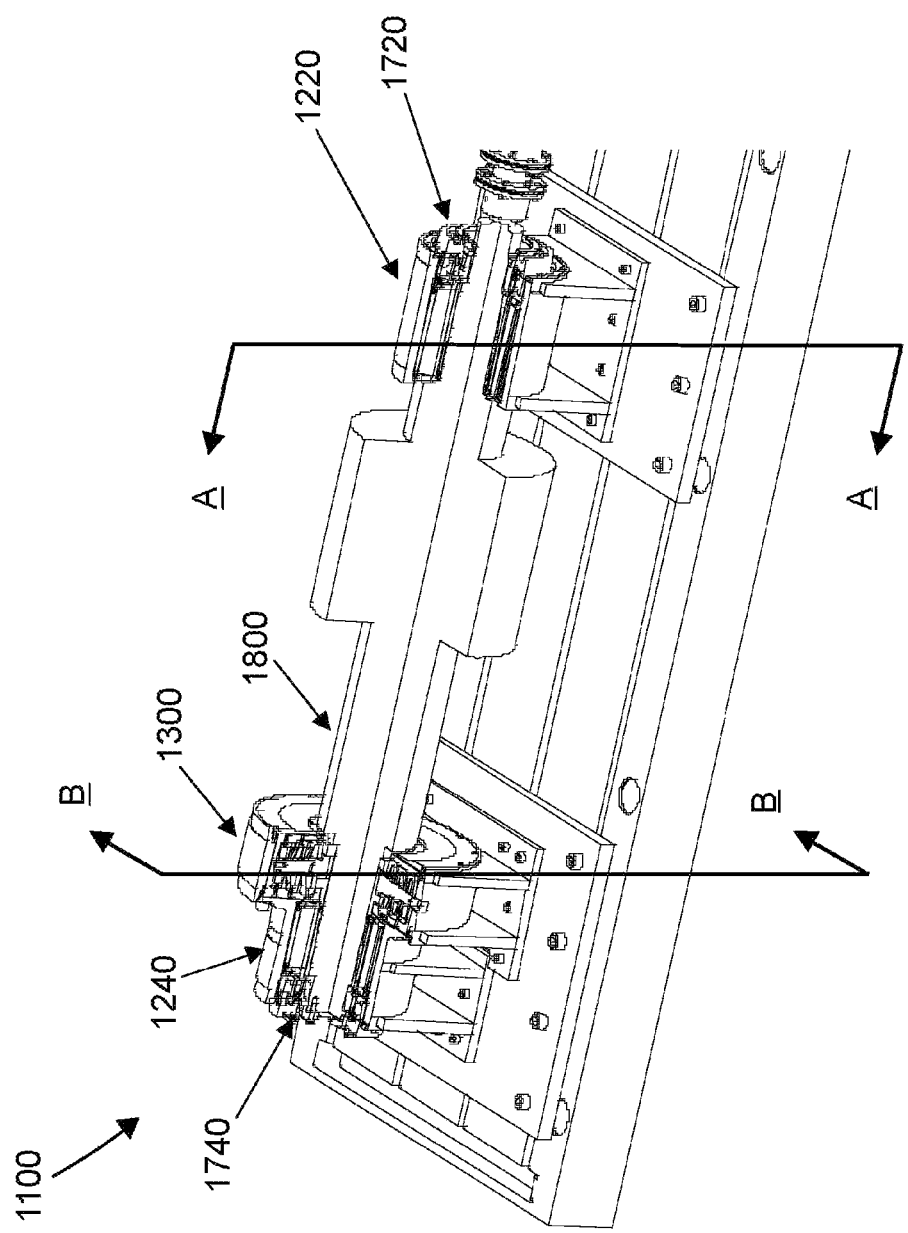
FIG. 2 is a perspective cut-away view of an exemplary embodiment of rotating machine.

FIG. 1 shows a perspective view of an exemplary magnetic bearing system 1000, which can include a rotating machine 1100 supported via magnetic bearings. Examples of rotating machines 1100 that can benefit from magnetic bearings can include compressors, blowers, pumps, turbines, motors, and generators. Certain rotating machines can include a drive motor 1200 for powering the rotating machine. As shown in FIG. 1 and FIG. 2, magnetic bearing system 1000 can include two radial bearings 1220, 1240 and/or a thrust bearing 1300 for supporting rotating shaft 1800 and/or maintaining a relative position of that shaft. One radial bearing 1220 can be located at the non-thrust end (NTE) of the machine 1100. Radial bearing 1240 and thrust bearing 1300 can be located together at the thrust-end (TE) of the machine. At the TE, thrust bearing 1300 can located inboard of the radial bearing 1240 to maximize the accessibility of components without removing the thrust disk, thereby improving maintainability and/or serviceability. Controlling the magnetic fields generated by the bearings 1220, 1240, and/or 1300, and thus the relative position of the shaft with respect to the non-rotating portions of the rotating machine, can be a magnetic bearing controller 1420.

Auxiliary bearings 1720, 1740 can be included as part of magnetic bearing system 1000 to provide support for rotating shaft 1800 should all the magnetic bearings fail and/or when power is turned off to the magnetic bearings. The design and/or location of auxiliary bearings 1720, 1740 can be chosen such that they can withstand the expected loading, have the required operational life, and/or are easily replaced in the field. In the exemplary cross section of an exemplary machine supported via magnetic bearings shown in FIG. 2, auxiliary bearings 1720, 1740 are shown located outboard of radial bearing 1220 on the NTE and outboard of the thrust bearing 1300 on the TE. Consequently, auxiliary bearings 1720, 1740 can be replaced without the removal of the rotors of radial bearings 1220, 1240 or the rotor of thrust bearing 1300.

Auxiliary bearings 1720, 1740 can be ball bearings with a radial gap between the inner race and the auxiliary bearing journals. The outer race can be mounted in a compliant ring that is in turn mounted in the bearing housing. Auxiliary bearings 1720, 1740 can be "soft-mounted" in the compliant rings to reduce the force on auxiliary bearings 1720, 1740 and/or to reduce the propensity for whirl by lowering the stiffness and/or increasing the damping. The mechanical properties for the compliant rings can be selected by performing a series of dynamic simulations of the ensuing motion of rotating shaft 1800 after it drops onto auxiliary bearings 1720, 1740 and/or selecting properties that minimize the propensity for whirl.

Magnetic bearing system 1000 can be designed to compensate for unbalance and/or other static and/or dynamic loads on rotating shaft 1800. Magnetic bearings 1220, 1240, 1300 can be designed to operate from approximately −320° F. (77 K) to an elevated temperature of approximately 300° F.

Certain exemplary embodiments of magnetic bearing system 1000 can include a controller 1420, which can be communicatively and/or electrically coupled to the magnetic bearings via a sensor electronics enclosure 1500 and/or a coil cable junction box 1600, so that controller can control the magnetic fields generated by each bearing, and thereby control the relative position of rotating shaft 1800 with respect to the non-rotating portions of rotating machine 1100. Certain exemplary embodiments of magnetic bearing system 1000 can provide a magnetic bearing controller 1420 of small size, for example, 12 in×6 in×6 in. This can provide opportunities to simplify the installation of the magnetic bearing system by mounting magnetic bearing controller 1420 in close proximity to and/or on the machine 1100, such as in an enclosure 1400. This greatly can reduce the cabling requirements and/or the time to perform the initial calibration and/or initialization of the magnetic bearing system. In such a system, the controller 1420 can be supplied with DC power and/or an Ethernet cable for communication. If desired, the controller 1420 can be located remotely from machine. Lengths of approximately 50 feet or more (e.g., up to about 100 yards) can be accommodated.

To minimize the size of the magnetic radial and/or thrust bearings, iron cobalt can be chosen for the magnetic material. The laminations for the radial bearings (stators and/or rotors) can be fabricated from Hiperco® 50 or equivalent, which is an iron cobalt alloy with approximately 49% cobalt. The thrust bearings can be fabricated from Hiperco® 27 or equivalent, which is an iron cobalt alloy with approximately 27% cobalt ("Hiperco" is a registered trademark of Carpenter Technology of Wyomissing, Pa.). To reduce the cost, silicon steel can be used for the radial bearings (stators and/or rotors), mild steel such as 1018 can be used for the thrust bearing stator, and/or high strength steel such as 4340 can be used for the thrust disk.

The magnetic bearings can include design innovations that can reduce the size of the bearing, including increasing the ratio of pole area to slot area (the "pole-fraction") at the bore of the stator, magnetically isolating the sectors of the stator, and/or packaging the position sensors between the coils of the electromagnets. This can translate into more load capacity for a given bearing size.

Fault Tolerant Architecture

Certain exemplary embodiments of the magnetic bearing system can provide a 3-channel fault tolerant architecture, where a channel is a sub-system that can include a position sensor, a group of radial magnets, a thrust magnet, a controller, and/or the amplifiers of each magnet's respective coil, etc. The level of fault tolerance can be N+2, meaning that two channels can fail and the magnetic bearings can continue to operate, although each failure can reduce the load capacity of the magnetic bearings. Even with a failure of one of the channels, the remaining load capacity can be sufficient for continued operation. Note that a simple failure of one sensor or one amplifier or one magnet typically is not sufficient to cause a failure of an entire channel. Thus the typical component failure mode can result in only minor degradation of capacity.

Figure 3:
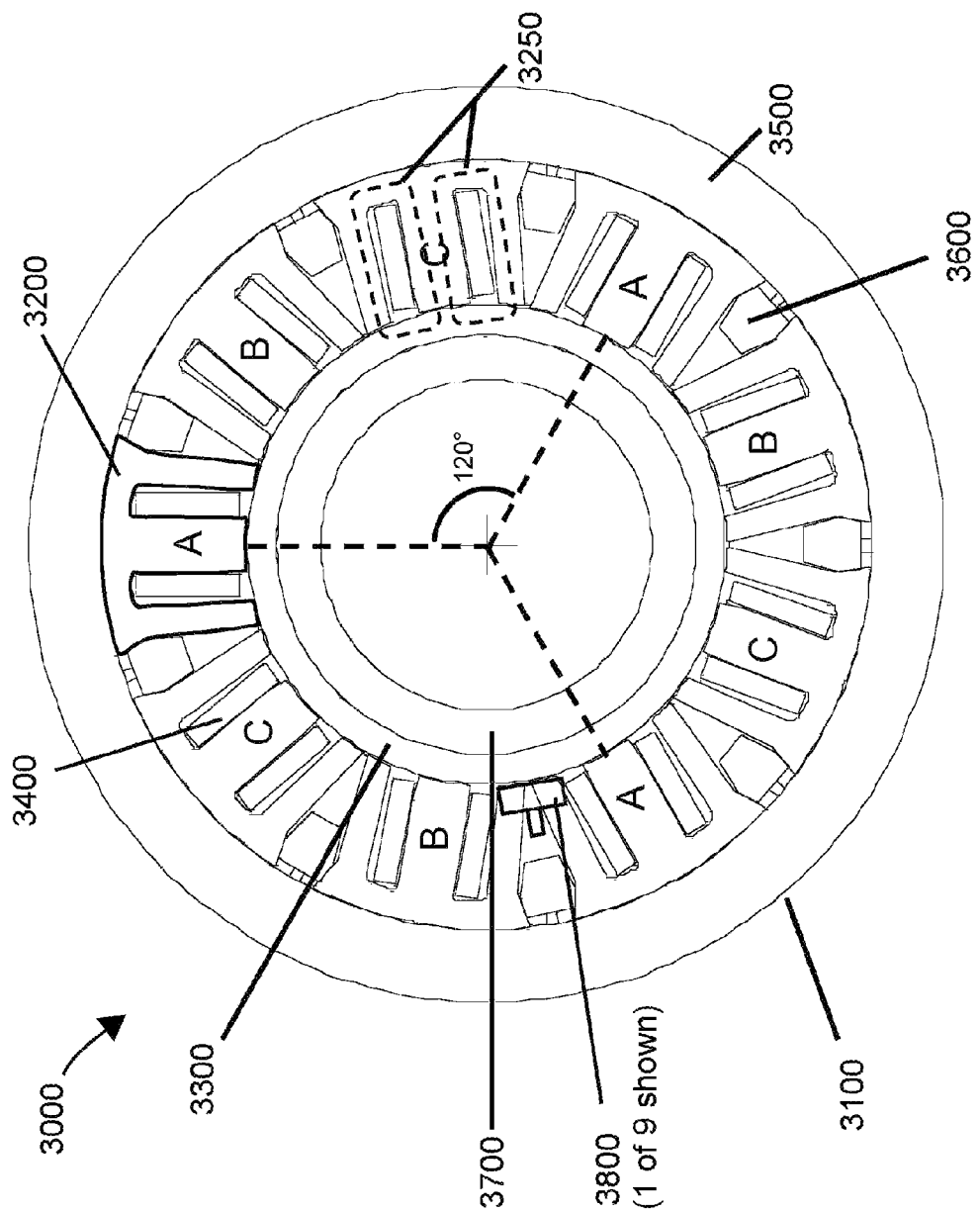
FIG. 3 is a cross-sectional view, viewed in the direction of the arrowheads attached to line A-A of FIG. 2, of a exemplary radial bearing.
Figure 4:
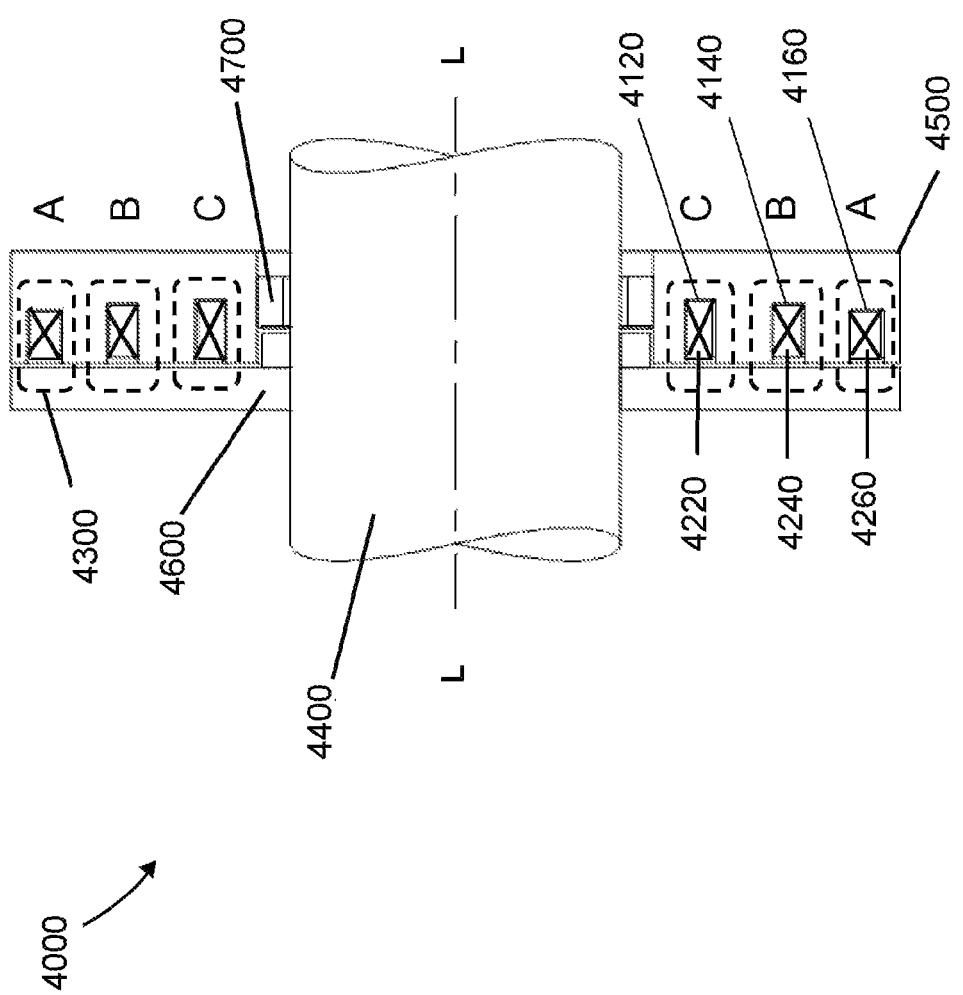
FIG. 4 is a cross-sectional view, viewed in the direction of the arrowheads attached to line B-B of FIG. 2, of a exemplary thrust bearing.

FIG. 3 and FIG. 4 show cross-sections of an exemplary fault-tolerant radial bearing 3000 and an exemplary thrust bearing 4000, respectively, where the three channels in the figures are represented by the letters A, B, and C. As shown in FIG. 3, each radial bearing stator 3100 can include, for example, nine magnets 3200 grouped into three channels of three magnets apiece. Each magnet 3200 is shown with E-shaped poles, although U-shaped poles are also possible. For each channel, the center of the magnets 3200 can be spaced approximately 120° apart about the longitudinal axis L-L (shown in FIG. 4) of the rotor so that each single channel can stably support the rotor shaft 3300 by operatively providing, in the context of FIG. 3 and FIG. 4, a vertical force component and/or, as needed, horizontal and/or longitudinal force components, to rotor shaft 3300. The magnetic flux generated by each magnet 3200 can be controlled via a current applied to a coil 3400 associated with that magnet, the current flowing through that coil inducing a magnetic field in the air gap between the rotor and stator. As shown by the flux path 3250, each magnet 3200 can be magnetically isolated so that the flux in one magnet is not necessarily influenced by the coil currents associated with the other magnets. To facilitate this magnetic isolation and/or to constrain motion of the magnets, each of magnets 3200 can be separated and/or secured to a non-magnetic housing 3500 with a non-magnetic wedge 3600, as shown. The rotor, which can include a stack of magnetic laminations that can magnetically interact with the magnets 3200, can be mounted on a hub 3700 which, in turn, can be mounted on shaft 3300. A shaft position sensor 3800 can be mounted substantially adjacent to each wedge 3600.

As shown in FIG. 4, at an exemplary thrust bearing 4000, a longitudinal position of a rotor portion 4600 with respect to a stator portion 4500 of rotating shaft 4400 can be sensed and/or detected via one or more longitudinal and/or thrust sensors 4700. To manage that longitudinal position, there can be three isolated thrust magnets 4120, 4140, 4160, each of which can be associated with a different channel (e.g., A, B, C, respectively), and/or each of which can be associated with a corresponding coil 4220, 4240, 4260, which can cause its magnet to develop a corresponding flux path 4300 that can magnetically interact with the steel of a thrust disk to influence a longitudinal position of rotating shaft 4400.

Figure 5:
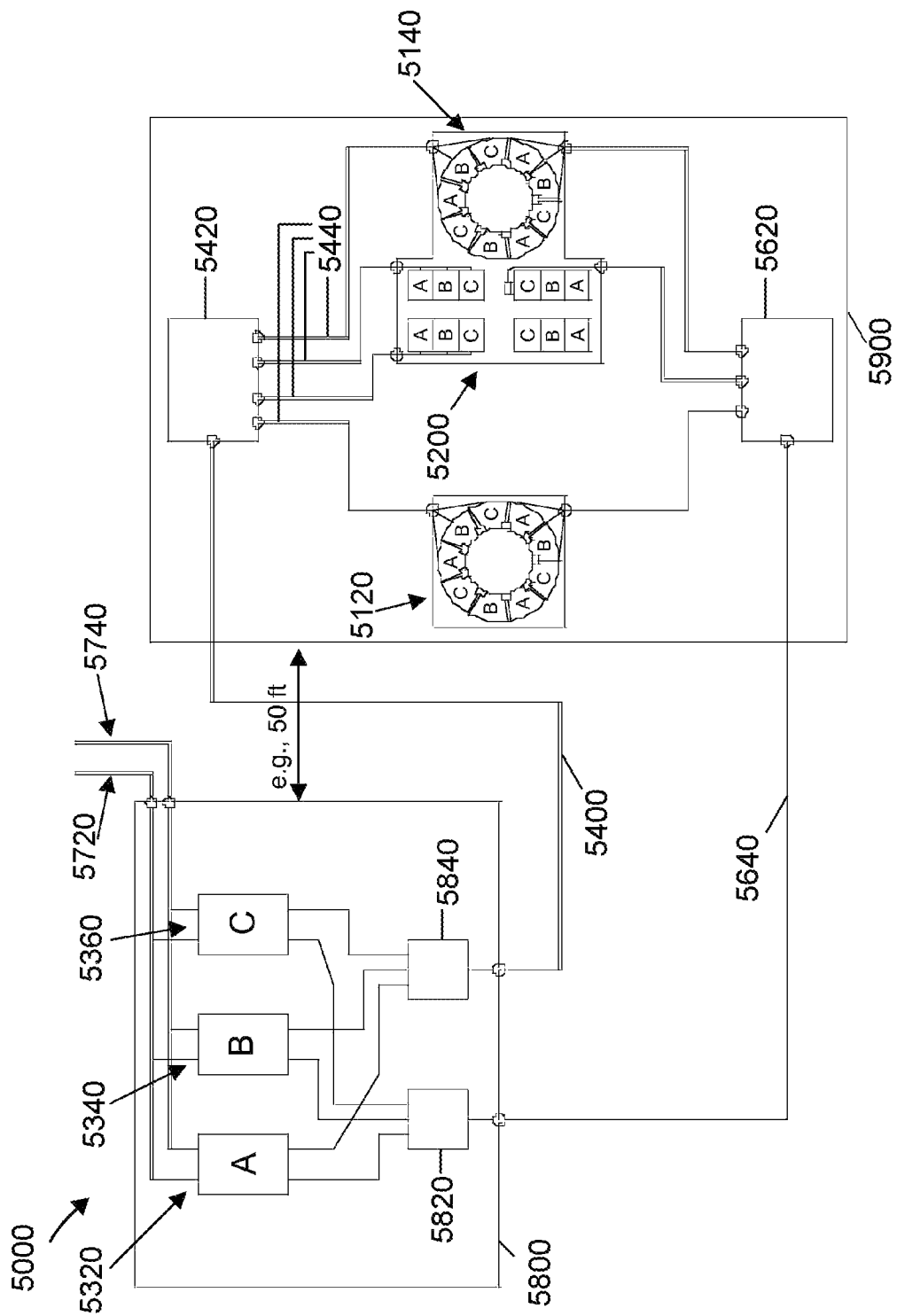
FIG. 5 is a block diagram of an exemplary fault tolerant system.

FIG. 5 is a block diagram of an exemplary fault tolerant system 5000. As shown in FIG. 5, to form a complete, distinct, and/or independent magnetic bearing control system, each channel (e.g., A, B, C) can include three magnetic sectors (e.g., A, A, and A; or B, B, and B; or C, C, and C) of each radial bearing 5120, 5140, one magnet (e.g., A, B, or C) of the thrust bearing 5200, a digital controller (e.g., 5320, 5340, or 5360), and/or amplifiers (located in each controller) for the coil of each magnet, each amplifier communicatively and/or electrically connected from a coil wire routing termination 5840 in the controller enclosure 5800 via a channel coil routing cable (e.g., 5400) to a coil cable junction box 5420 and then via a coil routing cable (e.g., 5440) to its respective coil. A failure of a channel can reduce the bearing load capacity by approximately one-third. However, the system 5000 can be designed so that with all magnets and channels in operation, the system can have capacity of approximately 120% of the required load capacity. Therefore, even upon a failure of an entire channel of system 5000, the magnetic bearings can nevertheless meet the requirement of 80% of the required load and/or can continue to fully support and/or position the rotating shaft. Even in the unlikely event of failure of two full channels, a single channel typically can be sufficient for 5-axis support of the rotating shaft.

So the magnetic bearing can continue to operate with a failed coil in the stator, the magnets within the stator can be magnetically isolated from other magnets by using non-magnetic materials for the housing and wedges. This isolation can ensure that if a coil on a stator pole develops a turn-to-turn short, the flux through that pole can be zero when the amplifier is turned off. If the magnetic flux is not zero due to flux leakage from other magnets, the varying flux can cause an induced voltage on the coil, which might lead to overheating of the coil and/or failure of the entire magnetic bearing.

There can be nine eddy current radial position sensors for each radial bearing 5120, 5140 and/or three eddy current position sensors for the thrust bearing 5200. The outputs of the sensors can be routed via sensor electronics enclosure 5620 and sensor signal cables 5640 and, for redundancy, input to all the controllers 5320, 5340, and 5360, regardless of the channel with which the sensor is associated, and/or a controller other than the controller associated with the channel. Therefore, the failure of any sensor can be detected and it need cause no degradation in the performance of the system. Note that any of the components shown within box 5900 can be machine mounted.

Any of controllers 5320, 5340, and 5360 can be located within a single enclosure 5800, which can include a sensor routing termination 5820 and a coil wire routing termination

5840. Each controller can be supplied with two sources 5720, 5740 of 440 $V_{AC}$, three-phase power. In the event of failure of one source of power, system 5000 can continue to operate without interruption.

The approach to fault tolerance described herein can provide a redundant, highly robust system.

Other Physical Features

In certain exemplary embodiments, at each end of the machine, the locations of the radial bearings, thrust bearings, and/or auxiliary bearings can be chosen with consideration to serviceability. Of the components of the magnetic bearing system, the auxiliary bearings are mostly likely to require servicing, since their life can be limited by the number of overload transients and/or de-levitations. Therefore, the auxiliary bearings can be located outboard of the magnetic bearings so that the auxiliary bearings can be inspected and/or replaced with minimal removal of machine parts. At the TE, it can be desirable to be able to service as many components as possible without the removal of the thrust disk, which can be heavy and/or can require special tooling to remove. For this reason, the thrust bearing can be located inboard of the radial bearing. At the TE, typically the only component of the magnetic bearing that is inboard of the thrust disk is one of the two thrust bearing stators. The thrust bearing can be designed so that all the position sensors are embedded in the outboard thrust stator. This can minimize the possibility of a component failure on the inboard thrust bearing stator.

The magnetic bearings can be designed to withstand an environmental temperature of approximately −321° F. (77 K) to approximately 300° F. The insulation systems for the magnetic bearing systems can be Class N or better, which can be suitable for temperatures up to approximately 350° F. (~200° C.). However, there can be some heat generated in the bearings due to resistive heating, magnetic core losses, and/or air friction (windage). This heat can be removed with cooling air that flows through the magnetic bearings.

Position Sensors

Figure 6:
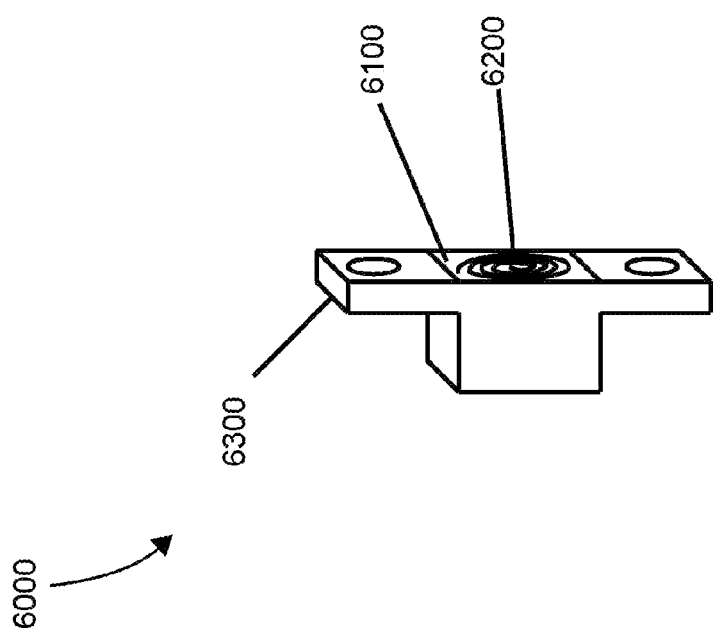
FIG. 6 is a perspective view of an exemplary eddy current position sensor.

Eddy current position sensors can be used that can be specifically designed for performance, reliability, and/or compact size. An exemplary sensor 6000 is shown in FIG. 6. A circuit board 6100 with a spiral conductive trace 6200 can be secured into a bracket 6300 and/or mounted in proximity to a non-magnetic, electrically conductive target on the shaft. The inductance of the sensors can vary with the proximity of the target. The sensor can form one component of a free-running oscillator, and/or changes in the gap between the sensor and the shaft can change the frequency of the oscillator. This can be considered to be a kind of frequency modulation (FM).

Control System

Figure 7:
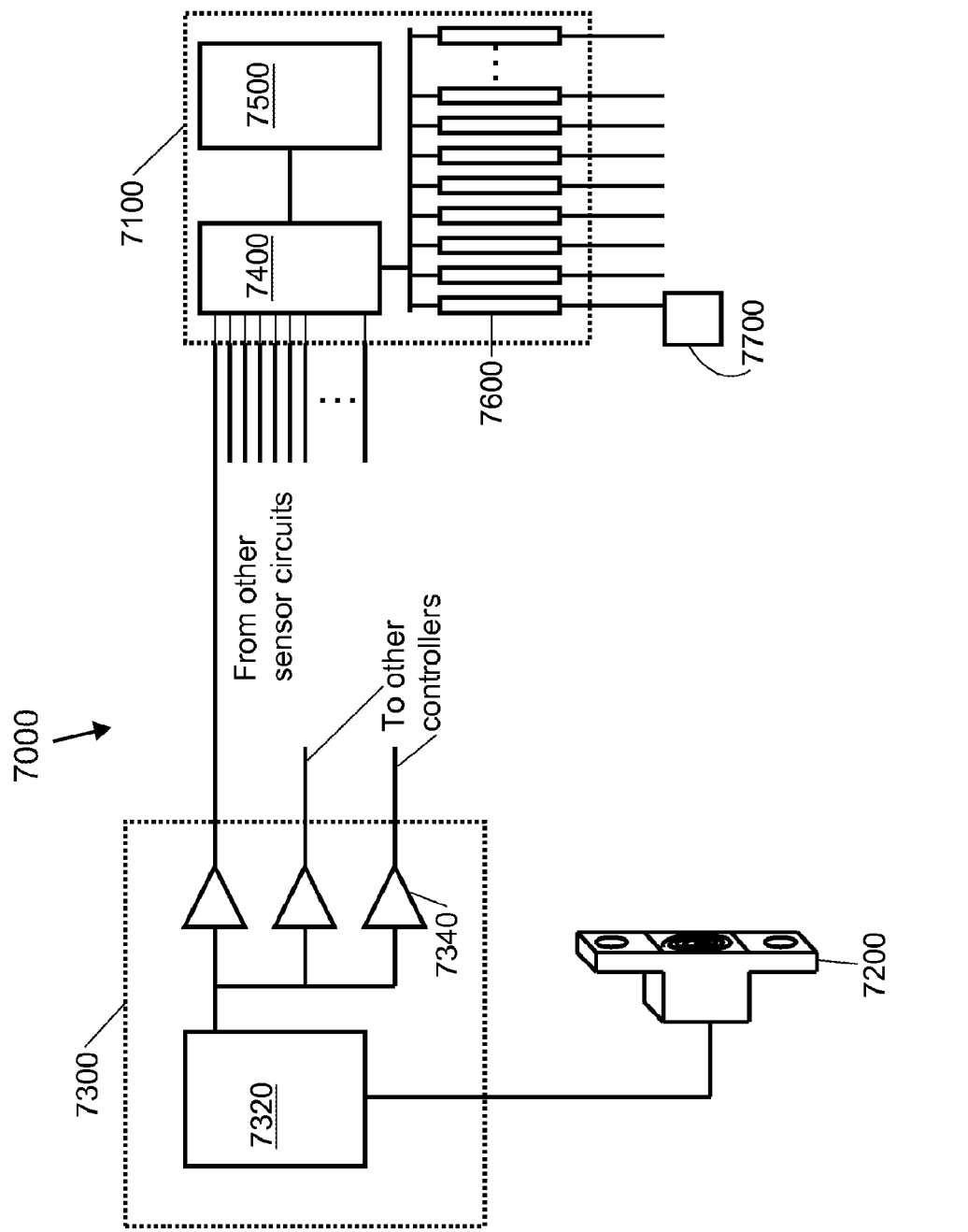
FIG. 7 is a block diagram of an exemplary control system.

One of the advantages of an FM sensor can be that the frequency can be converted into a digital value without the use of analog-to-digital (A/D) converters. Thus, as shown in FIG. 7, the frequency can be converted to a digital value using high speed counters that are configured in field programmable gate array (FPGA) 7400. Digital input channels can be implemented with significantly fewer resources than analog input channels, allowing for a much smaller set of controller boards. Consequently, more sensors can be implemented for additional redundancy and/or noise reduction in a smaller package size.

Using FM sensors with digital counters in an FPGA can reduce the electronic conditioning and/or conversion circuitry by a factor of approximately 20 compared to using analog sensors. Because the signals from the conditioning circuit can be trains of FM digital pulses, the signals sent to the magnetic bearing controller can be very immune to noise and/or can be sent over long distances without substantial degradation.

As shown in FIG. 7, a digital position signal can easily be shared among several controllers, such as 7100. For a fault tolerant system, three or more independent controllers can be used, each reading the same sensor signals. Having multiple redundant sensors 7200 can be an effective means of attenuating harmonic noise and/or greatly reducing the probability of a system fault due to a failure of a single sensor. The position signals can be shared using independent isolated digital line drivers 7340, so even if a signal is shorted out on one controller 7100, it can still be read by the other controllers. An exemplary embodiment of this approach is shown in FIG. 7.

As shown in the block diagram of FIG. 7, an exemplary control system 7000 can be a compact, high-performance system that can be re-configured into a fault-tolerant architecture. Thus, an exemplary controller 7100 can continue to function despite a single point failure of a sensor 7200, a sensor circuit 7300 (which can include an oscillator 7320 and a line driver 7340 for each controller), a field programmable gate array 7400 of controller 7100, a digital signal processor (DSP) 7500 of controller 7100, an amplifier 7600 of the many amplifiers controlled by controller 7100, or a coil 7700 coupled to amplifier 7600.

Control Process and Modules

Figure 8:
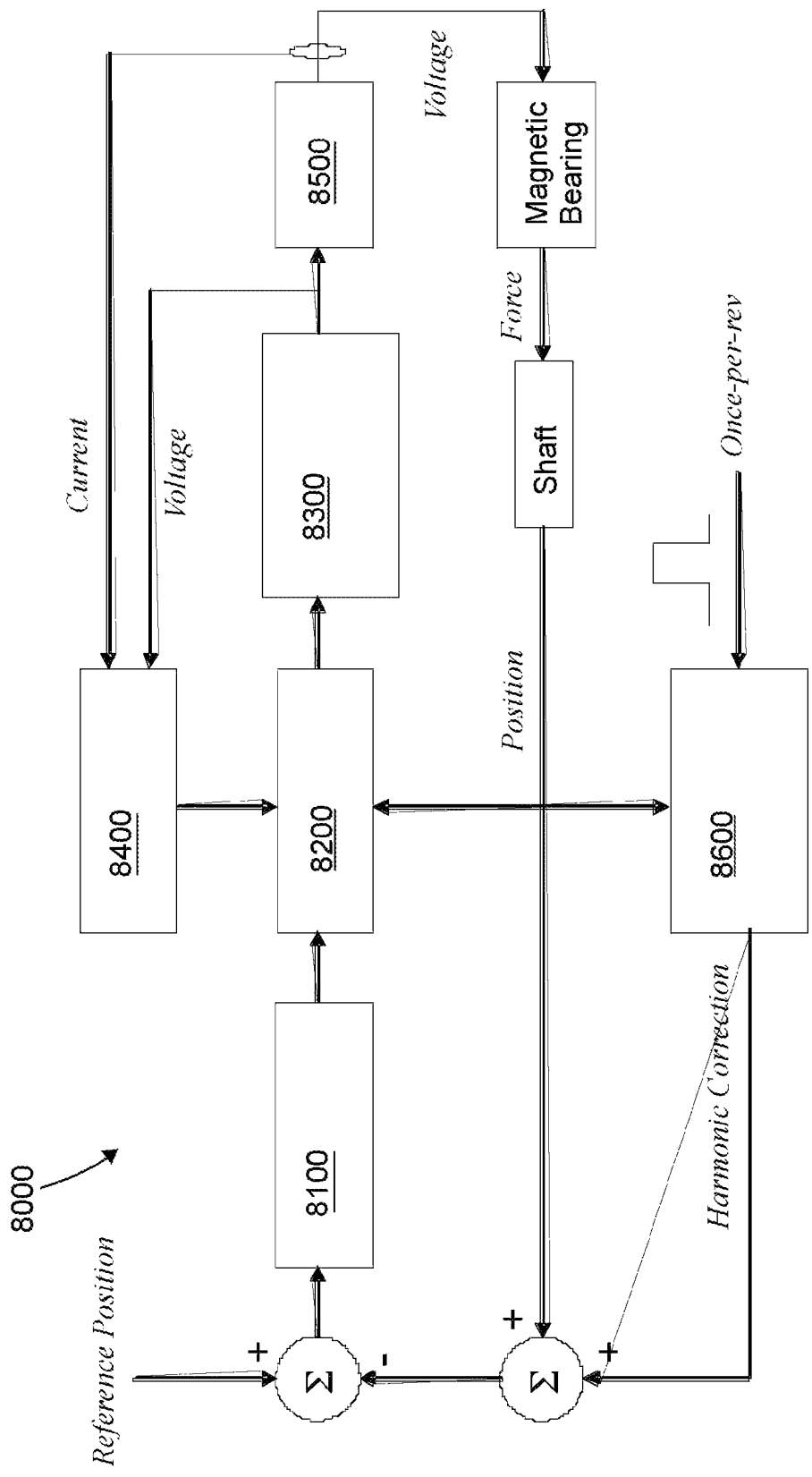
FIG. 8 is a block diagram of an exemplary control process.

FIG. 8 is a block diagram of an exemplary control process 8000. A controller can utilize either a single-input/single output (SISO) architecture or a multiple-input/multiple output (MIMO) architecture, either which that can be modified to improve dynamic performance and/or adaptive noise cancellation. Certain exemplary embodiments of the blocks in FIG. 8 can be described as follows, and/or can be implemented as software, firmware, and/or hardware modules and/or as one or more processes.

Compensation module 8100. The compensation module can determine what level of force should be applied based on the position error. The simplest of such approaches can be a PID process, which can be thought of as first-order transfer function with an integrator term. We generalize this compensation process to be an eighth-order transfer function plus an integrator term. As such, the gain and phase of the compensator can be shaped with eight zeroes and eight poles in an arbitrary manner, including first-order leads, first-order lags, notches, and/or second-order filters. The selection of the location (frequency and/or damping ratio) of these zeroes and/or poles can optimize the performance of the bearing, and/or can be easily accomplished with selection of input parameters via a user interface. This sometimes can be referred to as "tuning" the bearing. Typically, this optimization process can include time to properly characterize the rotating assembly, identify structural resonances in the static structure, and/or stabilize some and/or all of the identified system modes. The input parameters for the compensation module can be chosen using well-known techniques described in various references, such as those described in Mushi, Lin, Allaire, "Design, Construction and Modeling of a Flexible Rotor Active Magnetic Bearing Test Rig", Proceedings of ASME Turbo Expo 2010: Power for Land, Sea and Air GT2010, paper GT2010-23619, presented Jun. 14-18, 2010, Glasgow, UK.

Flux estimation module 8200. To improve the performance of the magnetic bearings, the magnetic flux in the air gap can be estimated using a module and/or process that can include the effects of coil inductance, coil resistance, and/or leakage flux. Because flux can be more closely related to the force in the bearing than current, the performance of the magnetic bearing can be improved, especially at high frequencies and/or high loadings, in which case non-linear effects such as eddy currents and/or magnetic saturation can degrade the performance. This process can have the force command from the compensation process as an input. It then can calculate the voltage required to achieve this level of force.

Dynamic force compensation module 8300. Under conditions of high dynamic force, the voltage output of the amplifier can be insufficient to "slew" the force at the required rate. This can be referred to as voltage saturation. Voltage saturation also can be caused by excessive high frequency gain and/or by sensor noise. When the amplifier is in a state of voltage saturation, the magnetic bearing can go unstable due to phase lag of the force produced by the magnetic bearing. With our dynamic force compensation module and/or process, this phase lag can be greatly reduced or eliminated by automatically reducing the gain, and/or the bearing can remain very stable, even under conditions of high dynamic force. This can create a dramatic improvement of performance and/or stability of the system. This feature can be important in situations where there is a potential of high dynamic loading. The input for this module and/or process can be the desired voltage calculated by the flux estimation model. The output can be the voltage after it is corrected for voltage saturation effects.

Coil Resistance module 8400. The voltage and current from each amplifier constantly can be monitored and/or an estimate for the resistance to the coil continuously can be updated. This resistance value can serve two purposes. For one, it can be used in the flux estimation process to estimate the flux in the coil. Secondly, it can be used to continuously monitor the health of the coil by detecting variations in the resistance.

Voltage Amplifier 8500. The amplifiers used in the controllers can be pulse wave modulated (PWM) amplifiers in which the output voltage can be controlled by varying the width of the voltage pulse sent to the coils. There need be no inner loop to control the current and there need be no requirement to "flux tune" the amplifiers.

Adaptive Noise Cancellation module 8600. The controller can include two enhancements that can use adaptive cancellation modules and/or processes. The "Magnetic Balance" feature can minimize synchronous (once-per-revolution) vibration of the shaft by adaptively injecting a synchronous force correction. By contrast, the "Inertial Balance" feature adaptively can minimize synchronous force in the bearing by adaptively injecting synchronous position correction (the Magnetic Balance and Inertial Balance typically are not simultaneously applied). The Inertial Balance can be extended to reduce acoustic noise at the synchronous frequency and/or for harmonics of the synchronous frequency. For a linear system, the cancellation at one frequency can be independent of the cancellation at other frequencies, and therefore the processes can be extended to multiple harmonic frequencies.

The controller can utilize SISO because it has proven to be a simple and robust technique, as which has been described in various publications, such as Mushi, Lin, Allaire, "Design, Construction and Modeling of a Flexible Rotor Active Magnetic Bearing Test Rig", Proceedings of ASME Turbo Expo 2010: Power for Land, Sea and Air GT2010, paper GT2010-23619, presented Jun. 14-18, 2010, Glasgow, UK. However, the process can be extended to be a multiple input-multiple output (MIMO) controller in which states of the system are independently observed and controlled. MIMO controllers can be successfully used, for example, for systems in which the two rigid body modes of the system vary widely in frequency such that it is difficult to devise a compensation process that adequately stabilizes both modes (decomposition of the displacement into more than two modes can require sensors located at additional planes along the length of the shaft). By using sensors simultaneously from two magnetic bearings, the rigid body displacement of the shaft can be decomposed into the superposition of the two rigid body modes and then the modes can be independently controlled.

Noise Attenuation

Figure 9:
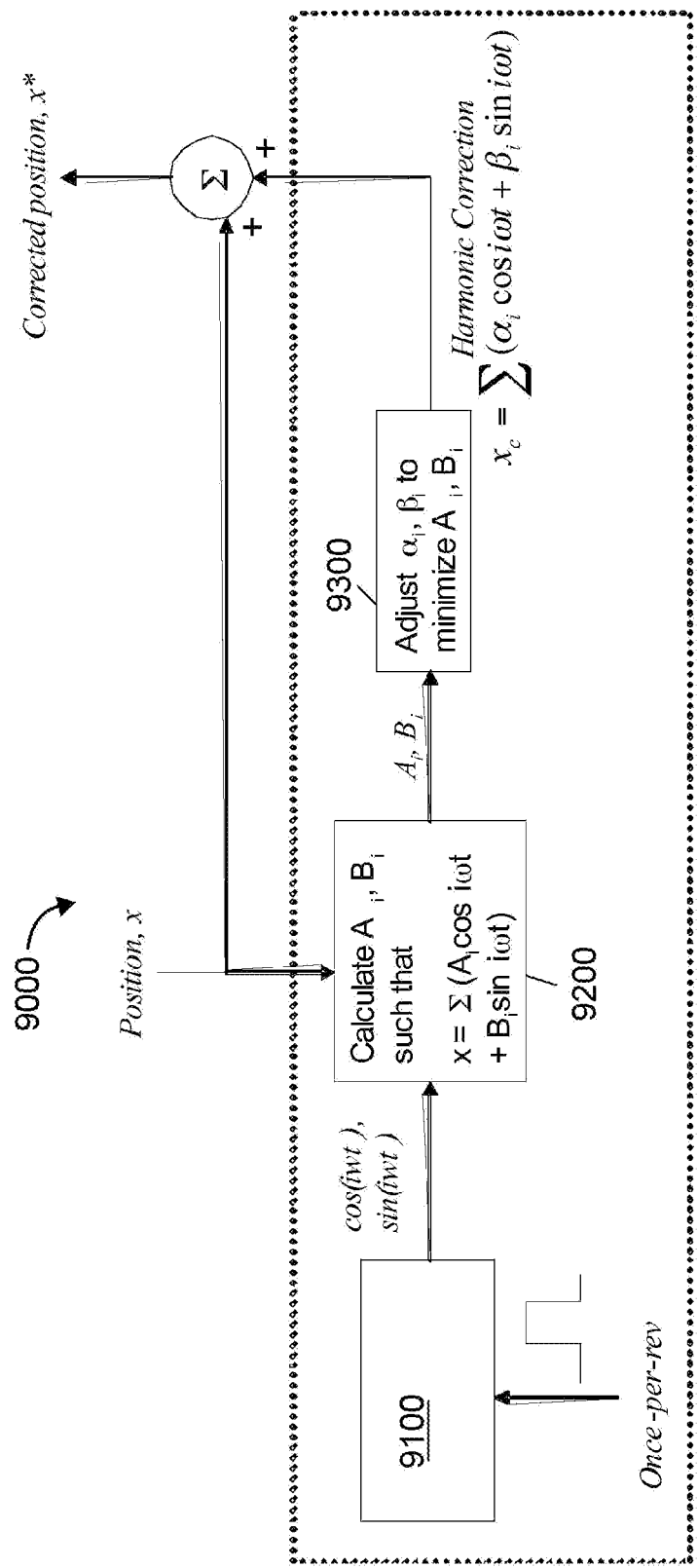
FIG. 9 is a block diagram of an exemplary adaptive cancellation process.

An exemplary way in which noise can be attenuated can be the adaptive control of transmitted forces from the bearings into the structure. The adaptive noise cancellation process can minimize the transmitted force at harmonic frequencies of the rotational frequency. An exemplary embodiment of such a process 9000 and/or module is shown in FIG. 9. A once-per-revolution pulse can be tracked with phase-locked loop (PLL) process 9100. The output of the PLL process 9100 can be a set of sine and cosine signals at integral multiples of the frequency of the once-per-rev signal. For example, if up to the ninth harmonic is to be attenuated, then nine pairs of sine and cosine signals can be utilized. At block 9200, these sine and cosine signals then can be used to compute the Fourier coefficients of the position signal. At block 9300, the Fourier coefficients of the position signal $A_i$, $B_i$ can be minimized by adding a harmonic correction to the position signal, and/or adaptively adjusting the Fourier coefficients of the harmonic correction $\alpha_i$, $\beta_i$ until $A_i$ and $B_i$ are small.

Figure 10:
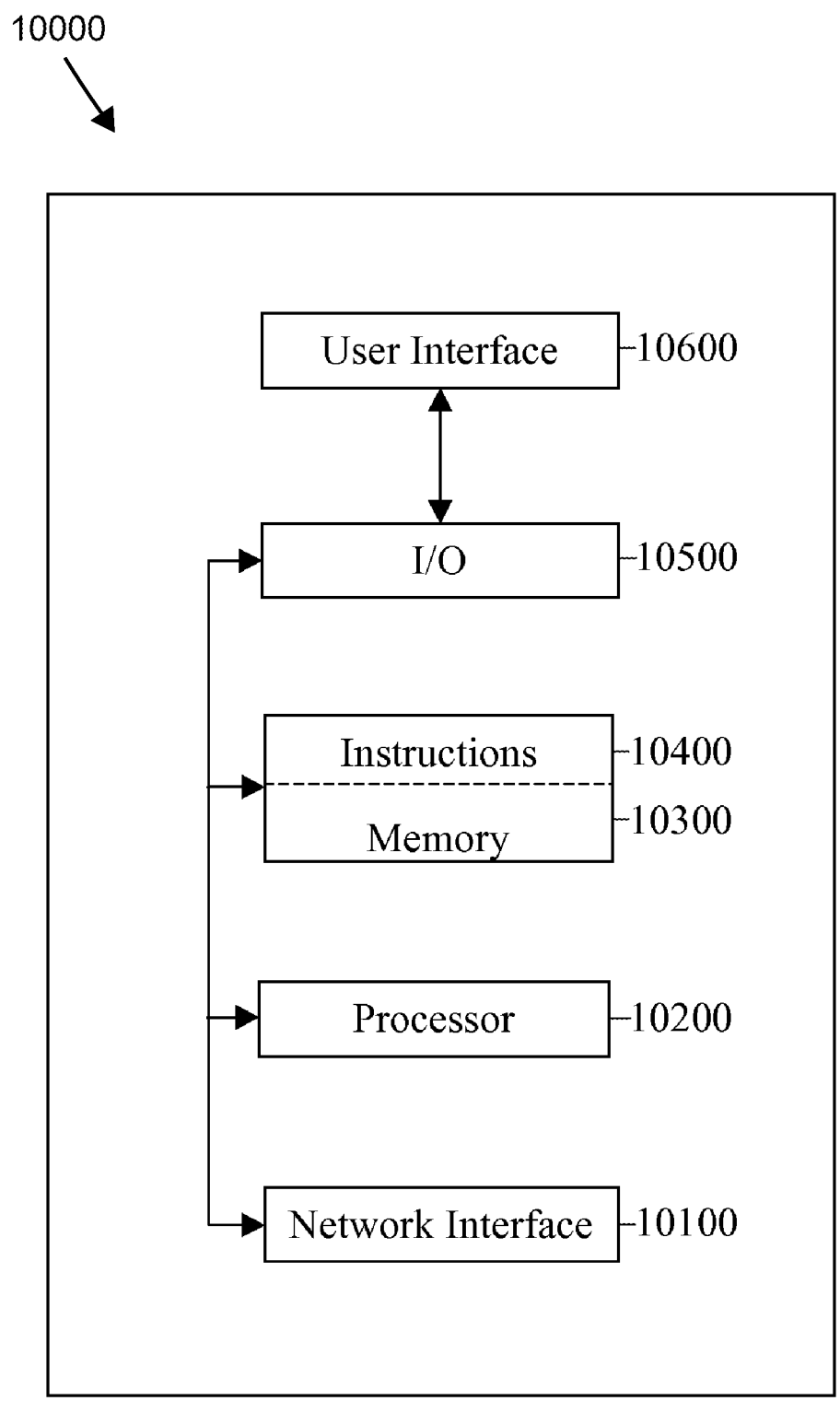
FIG. 10 is a block diagram of an exemplary embodiment of an information device.

FIG. 10 is a block diagram of an exemplary embodiment of an information device 10000, which in certain operative embodiments can comprise, for example, controller 7100 of FIG. 7. Information device 10000 can comprise any of numerous transform circuits, which can be formed via any of numerous communicatively-, electrically-, magnetically-, optically-, fluidically-, and/or mechanically-coupled physical components, such as for example, one or more network interfaces 10100, one or more processors 10200, one or more memories 10300 containing instructions 10400, one or more input/output (I/O) devices 10500, and/or one or more user interfaces 10600 coupled to I/O device 10500, etc.

In certain exemplary embodiments, via one or more user interfaces 10600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Figure 11:
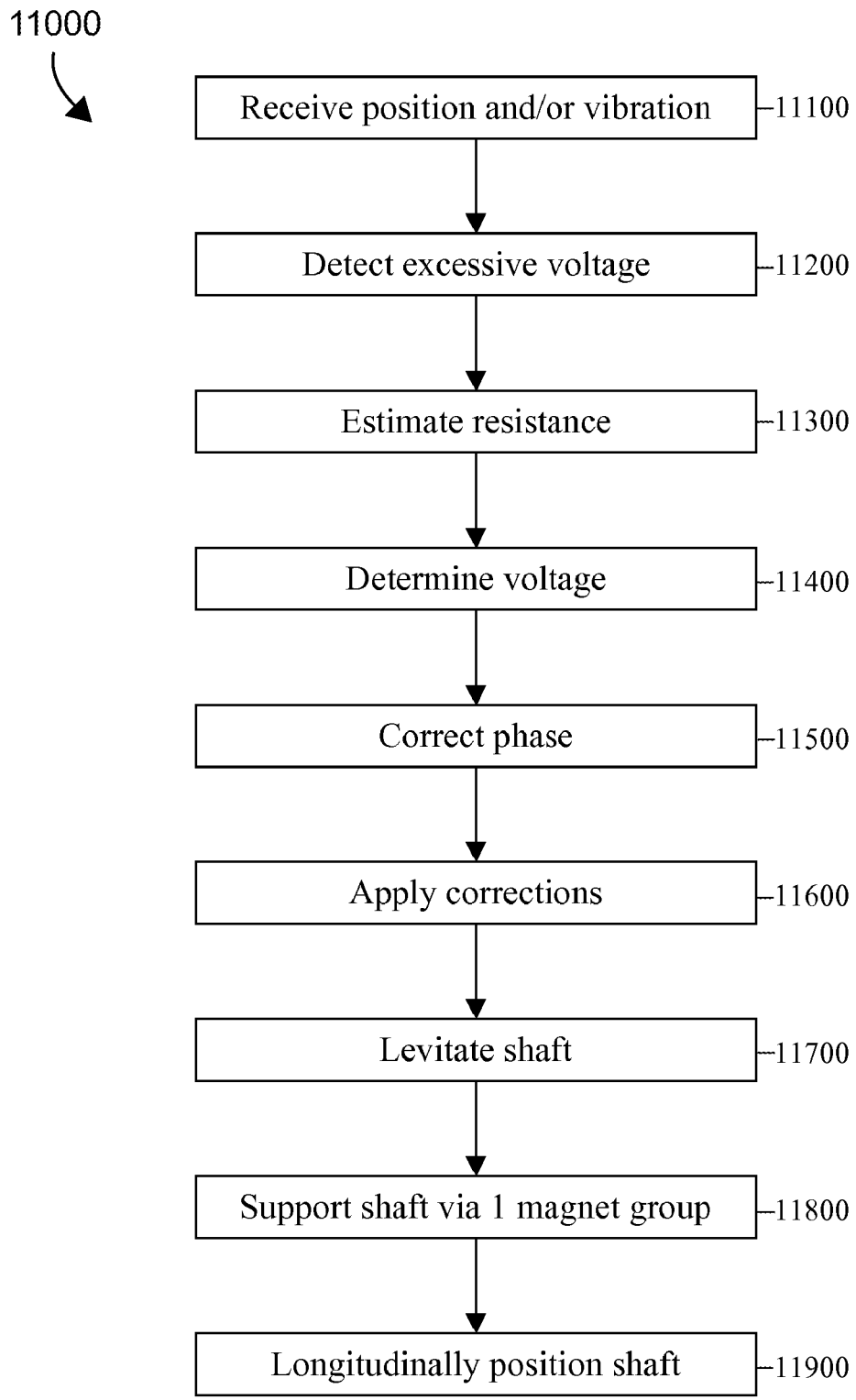
FIG. 11 is a flowchart of an exemplary embodiment of a method.

FIG. 11 is a flowchart of an exemplary embodiment of a method 11000. At activity 11100, a controller can receive a sensed, detected, and/or transmitted indication of a position of a rotating shaft and/or a sensed, detected, and/or transmitted indication of a stator magnetic bearing-generated vibration. At activity 11200, the controller can detect, recognize, and/or determine that an applied coil voltage exceeds a coil amplifier voltage capability. At activity 11300, the controller can estimate a resistance of a coil. At activity 11400, the controller can determine a voltage to be delivered to a coil. At activity 11500, the controller can correct a phase of a flux of a magnet corresponding to a coil. At activity 11600, the controller can adaptively apply sufficient corrections to a received position signal and/or a magnetic bearing force of said shaft to attenuate a stator magnetic bearing-generated vibration, such as a vibration that is transmitted synchronously with a rotational frequency of said shaft and/or one or more harmonics of said rotational frequency. At activity 11700, via at least two magnetic radial bearings, magnetically levitating a rotating shaft, each of the magnetic radial bearings comprising at least three stator magnet groups, each of the stator magnet groups comprising at least three stator magnets that are substantially uniformly distributed around a longitudinal axis of the rotating shaft, no pair of the at least three stator magnets separated by 180 degrees measured about the longitudinal axis, each of the stator magnet groups operatively adapted to fully support the rotating shaft independently of each other of the stator magnet groups. At activity 11800, via any of the stator magnet groups, fully supporting the rotating shaft independently of each other of the stator magnet groups. At activity 11900, via at least one magnetic thrust bearing, longitudinally positioning the shaft, the magnetic thrust bearing comprising at least three isolated thrust magnets.

Potentially Unique Features

The following are potentially unique features of various exemplary embodiments:

a redundant magnetic bearing system that can include two magnetic radial bearings each with nine magnets and/or a magnetic thrust bearing that can include 6 magnets and three processors, all divided into 3 channels of redundancy, where each channel can control 3 magnets in each radial bearing and/or 2 magnets in the thrust bearing and/or can independently and/or stably support a shaft;

two or more sources of independent power that can be supplied to the redundant system;

eddy current position sensors that can use spiral traces of conductor to detect the position of a shaft;

sensor circuitry that can employ an oscillator that can vary in frequency according to the proximity of the shaft to the position sensor, such as the position sensor described above;

a controller that can use high speed timers to measure the frequency of the oscillator in the sensor circuit, thereby measuring the shaft position, and/or eliminating the need for analog-to-digital (D/A) converters for shaft position;

a control module and/or process that can use the measured coil current along with the past applied voltage to estimate the coil resistance, which then can be used in a flux estimation model to determine the optimum value of voltage to be delivered by the amplifiers;

a controller that can correct the phase of the flux in the magnetic bearing when the optimum applied voltage exceeds the voltage capability of the amplifier, the phase correction made by simultaneously reducing the dynamic force applied in a way that maintains the correct phase, thereby greatly improving the stability of the magnetic bearing;

a controller that adaptively can apply harmonic corrections to the position signals in such a way that the force at the synchronous (once-per-revolution) frequency is attenuated, as well as harmonics of the synchronous frequency; and/or a controller that adaptively can apply harmonic corrections to the magnetic bearing force in a such a way that the vibration at the synchronous (once-per-revolution) frequency is attenuated, as well as harmonics of the synchronous frequency.

Further Embodiments

Certain exemplary embodiments can provide a machine that can comprise: at least two magnetic radial bearings adapted to magnetically levitate a rotating shaft, each of the magnetic radial bearings comprising at least three stator magnet groups, each of the stator magnet groups comprising at least three stator magnets that are substantially uniformly distributed around a longitudinal axis of the rotating shaft, no pair of the at least three stator magnets separated by 180 degrees measured about the longitudinal axis, each of the stator magnet groups operatively adapted to fully support the rotating shaft independently of each other of the stator magnet groups.

Certain exemplary embodiments can provide a machine that can comprise: at least three distinct magnetic bearing control systems, each of the control systems operatively adapted to magnetically levitate a rotating shaft independently of each other of the control systems, each of the control systems comprising a stator radial magnet group corresponding to each of at least two magnetic radial bearings, each of the stator radial magnet groups comprising at least three stator magnets substantially uniformly distributed around a longitudinal axis of the rotating shaft, no pair of the at least three magnets from any stator radial magnet group separated by 180 degrees measured about the longitudinal axis.

Certain exemplary machines can further comprise:

at least two magnetic radial bearings;

at least one magnetic thrust bearing adapted to longitudinally position the shaft, the magnetic thrust bearing comprising at least three isolated thrust magnets;

an eddy current position sensor associated with each of the stator magnets;

an eddy current position sensor associated with each of the stator magnets, the eddy current position sensor comprising a spiral trace conductor adapted to detect a position of the shaft; and/or an eddy current position sensor associated with each of the stator magnets, the eddy current position sensor comprising an oscillator having an output that varies in frequency according to a proximity of the shaft to the eddy current position sensor;

wherein:

each of the control systems comprises at least two isolated thrust magnets adapted to longitudinally position the shaft;

each of the stator magnet groups is associated with a communication channel;

all of the stator magnet groups is adapted to be electrically controlled by each of a plurality of controllers;

each of the stator magnet groups is adapted to be electrically controlled by a corresponding controller responsive to a frequency of an oscillator signal that varies according to a proximity of the shaft to a position sensor associated with a stator magnet of the stator magnet group;

each of the stator magnets is magnetically isolated;

each of the stator magnets is secured to a non-magnetic housing via a non-magnetic wedge;

each of the stator magnets is separated from each other of the stator magnets via a non-magnetic wedge;

at least one magnetic thrust bearing comprising at least three isolated thrust magnets;

each of the stator magnets is associated with a corresponding coil, the machine adapted to estimate a resistance of each coil based on a measured coil current and a past voltage applied to the coil, and to determine a voltage to be delivered to the coil based on the resistance;

each of the stator magnet groups is associated with a corresponding controller, each of the stator magnets is associated with a corresponding coil, responsive to a voltage applied to a predetermined coil exceeding a voltage capability of an amplifier corresponding to the predetermined coil, a corresponding controller adapted to correct a phase of a flux of a stator magnet corresponding to the predetermined coil;

each of the stator magnet groups is associated with a corresponding controller, each of the controllers adapted to adaptively apply sufficient corrections to a received position signal of the shaft to attenuate a stator magnetic bearing-generated vibration that is transmitted synchronously with a rotational frequency of the shaft and/or one or more harmonics of the rotational frequency; and/or each of the stator magnet groups is associated with a corresponding controller, each of the controllers adapted to adaptively apply sufficient corrections to a magnetic bearing force to attenuate a stator magnetic bearing-generated vibration that is transmitted synchronously with a rotational frequency of the shaft and/or one or more harmonics of the rotational frequency.

Certain exemplary embodiments can provide a method that can comprise, a machine-readable medium storing machine-implementable instructions for activities that can comprise, and/or a circuit comprising a first sub-circuit adapted for: via at least two magnetic radial bearings, magnetically levitating a rotating shaft, each of said magnetic radial bearings comprising at least three stator magnet groups, each of said stator magnet groups comprising at least three stator magnets that are substantially uniformly distributed around a longitudinal axis of said rotating shaft, no pair of said at least three stator magnets separated by 180 degrees measured about said longitudinal axis, each of said stator magnet groups operatively adapted to fully support said rotating shaft independently of each other of said stator magnet groups.

Certain exemplary methods, instructions, and/or circuits can further comprise and/or be adapted for:

via any of said stator magnet groups, fully supporting said rotating shaft independently of each other of said stator magnet groups; and/or via at least one magnetic thrust bearing, longitudinally positioning said shaft, said magnetic thrust bearing comprising at least three isolated thrust magnets.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
about—around.
according—per, agreeing with, conforming with, in accord with, pursuant to, and/or consistent with.
activity—an action, act, deed, function, step, and/or process and/or a portion thereof
adapted to—made suitable and/or fit for a specific use and/or situation.
adaptively—performing differently at different times.
adjacent—in close proximity to, near, next to, and/or adjoining
adjust—to change so as to match, fit, adapt, conform, and/or be in a more effective state.
amplifier—a device that increases a magnitude and/or strength of signals passing through it.
and—in conjunction with.
and/or—either in conjunction with or in alternative to.
annular—shaped like a ring.
any—one, some, every, and/or all without specification.
aperture—an opening, hole, gap, passage, and/or slit.
apparatus—an appliance or device for a particular purpose
apparent power—a value computed by multiplying the root-mean-square (rms) current by the root-mean-square voltage and commonly measured in units such as volt-amps.
apply—to put to, on, and/or into action and/or service; to implement; and/or to bring into contact with something.
approximate—nearly the same as.
are—to exist.
around—about, surrounding, and/or on substantially all sides of.
associate—to join, connect together, and/or relate.
at least—not less than, and possibly more than.
attach—to fasten, secure, couple, and/or join.
attenuate—to lessen, diminish, and/or reduce.
automatically—acting or operating in a manner essentially independent of external influence or control. For example, an automatic light switch can turn on upon "seeing" a person in its view, without the person manually operating the light switch.
axial—located on, around, or in the direction of an axis.
axis—a straight line about which a body or geometric object rotates or can be conceived to rotate and/or a center line to which parts of a structure or body can be referred.
based—being derived from, conditional upon, and/or dependent upon.
bearing—a device that supports, guides, and reduces the friction of motion between fixed and moving machine parts.
between—in a separating interval and/or intermediate to.
Boolean logic—a complete system for logical operations.
can—is capable of, in at least some embodiments.
capability—an ability that has potential for use.
cause—to produce an effect.
center—(n) a point that is substantially equally distant from the outer boundaries of something; (v) to move and/or align something with respect to a central point, line, and/or plane.
channel—a control system; and/or a frequency, wavelength, and/or code value; and/or a range associated with the transmission of one or more communication signals.
circuit—a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network.

circuit board—a substantially flat plastic and/or fiberglass board on which interconnected circuits and/or components are laminated and/or etched, the circuits having microprocessors, memories, transistors, capacitors, resistors, diodes, and/or other electronic components mechanically mounted and/or electrically coupled directly thereto.

circumference—a boundary line of a substantially circular figure, area, and/or object.

coil—(n) a continuous loop comprising two or more turns of electrically conductive material. (v) to roll and/or form into a configuration having a substantially spiraled cross-section.

communication—a transmission and/or exchange of information.

component—a constituent element and/or part.

comprising—including but not limited to.

conduct—to act as a medium for conveying something such as heat and/or electricity.

conductor—that which conducts electricity.

conduit—a tube, channel, and/or duct for substantially enclosing electric wires and/or cable.

configure—to make suitable or fit for a specific use or situation.

connect—to join or fasten together.

connection—a physical and/or logical link and/or channel between two or more points in a system. For example, a wire, an optical fiber, a wireless link, and/or a virtual circuit, etc.

contact—to touch.

containing—including but not limited to.

control—(n) a mechanical or electronic device used to operate a machine within predetermined limits; (v) to exercise authoritative and/or dominating influence over, cause to act in a predetermined manner, direct, adjust to a requirement, and/or regulate.

controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.

convert—to transform, adapt, and/or change.

correct—to remedy, adjust in value, and/or change to a more desired value.

correction—a change to a more desired value.

corresponding—related, associated, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

cover—a substantially planar object configured to protect and/or conceal.

create—to bring into being.

current—a flow of electrical energy.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of; and/or to precisely and/or distinctly describe and/or specify.

deliver—to give forth, produce, and/or transfer of possession of desired—indicated, expressed, and/or requested.

detect—to sense, perceive, identify, discover, ascertain, respond to, and/or receive the existence, presence, and/or fact of.

determine—to obtain, calculate, decide, deduce, establish, and/or ascertain.

device—a machine, manufacture, and/or collection thereof.

digital—non-analog and/or discrete.

digital signal processor—a programmable digital microprocessor adaptable to perform calculations and/or manipulations on signals.

disk—a thin, substantially flat, substantially circular object and/or plate.

distinct—discrete and/or readily distinguishable from all others.

distribute—to deliver, pass out, and/or spread; to arrange; and/or to disseminate, broadcast, and/or communicate to multiple receivers.

each—every one of a group considered individually.

eddy current—an electric current induced in a massive conductor, such as the core of an electromagnet, transformer, etc., by an alternating magnetic field electrical—relating to producing, distributing, and/or operating by electricity.

electromagnet—a device comprising a coil of insulated wire wrapped around an iron core that becomes magnetized when an electric current flows through the wire.

electronic—digitally processed, stored, and/or transmitted.

embed—to fix firmly in a surrounding mass, to enclose snugly and/or firmly, and/or to cause to be an integral part of.

estimate—(v.) to calculate and/or determine approximately and/or tentatively; (n.) a value calculated and/or determined approximately and/or tentatively.

Ethernet—a frame-based computer networking technology for local area networks (LANs). It defines wiring and signaling for the physical layer, and frame formats and protocols for the media access control (MAC)/data link layer of the OSI model.

exceeding—greater than.

external—relating to, existing on, and/or connected with the outside or an outer part; exterior.

first—an initial entity in an ordering of entities and/or immediately preceding the second in an ordering.

flux—the lines of force of an electric or magnetic field; and/or the strength of a field in a given area expressed as the product of the area and the component of the field strength at right angles to the area.

force—a capacity to do work or cause physical change.

frequency—the number of times a specified periodic phenomenon occurs within a specified interval.

from—used to indicate a source, origin, and/or location thereof fully—completely.

further—in addition.

gap—an interruption of continuity and/or a space between objects.

generate—to create, produce, give rise to, and/or bring into existence.

group—a plurality of determined units.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

harmonic—a wave, signal, movement, and/or vibration whose frequency is a whole-number multiple of that of another; and/or a whole-number multiple of a value of another variable.

having—possessing, characterized by, comprising, and/or including but not limited to.

heat—energy associated with the motion of atoms and/or molecules and capable of being transmitted through solid and fluid media by conduction, through fluid media by convection, and through a fluid and/or empty space by radiation.

heat sink—a device adapted to transfer thermal energy away from a connected object and/or a device that absorbs and/or dissipates heat generated by a system.

housing—something that covers, encloses, protects, holds, and/or supports, such as a frame, box, and/or chassis.

human-machine interface—hardware and/or software adapted to render information to a user and/or receive information from the user; and/or a user interface.

including—including but not limited to.

increase—to become greater or more in size, quantity, number, degree, value, intensity, and/or power, etc.

independently—without the aid of, use of, and/or reliance upon another.

indicative—serving to indicate.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input—a signal, data, and/or information provided to a processor, device, and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

instructions—directions, which can be implemented as firmware and/or software, the directions adapted to perform a particular operation or function.

isolate—to segregate, separate, and/or shield from one another.

levitate—to rise, suspend, and/or float, and/or to cause to rise, suspend, and/or float, as if lighter than a surrounding medium.

located—situated in a particular spot and/or position.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

longitudinal—of and/or relating to a length; placed and/or running lengthwise.

longitudinal axis—a straight line defined parallel to an object's length and passing through a centroid of the object.

machine—a device and/or vehicle adapted to perform at least one task.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain machine-implementable instructions, data, and/or information. Examples include a memory device, punch cards, etc.

magnetic—having the property of attracting iron and certain other materials by virtue of a surrounding field of force.

magnetic bearing—a bearing that supports a load using magnetic levitation.

magnetic flux level—a measure of a quantity of magnetism, being the total number of magnetic lines of force passing through a specified area in a magnetic field. Also known as magnetic flux density per unit area, the SI unit for which is the weber.

magnitude—a size and/or extent.

maintain—to retain, preserve, sustain, keep in an existing state, and/or continue to obtain.

may—is allowed and/or permitted to, in at least some embodiments.

measured—determined, as a dimension, quantification, and/or capacity, etc. by observation.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not preempting all uses of a fundamental principal.

model—to calculate, estimate, or predict.

mount—(n) that upon which a thing is attached. (v) to couple, fix, and/or attach on and/or to something.

net—overall, resulting, and/or average.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

no—an absence of and/or lacking any.

non-magnetic—not magnetic.

operatively—in a manner able to function and/or to work.

opposing—opposite; against; being the other of two complementary or mutually exclusive things; and/or placed or located opposite, in contrast, in counterbalance, and/or across from something else and/or from each other.

oscillator—a circuit and/or device for producing an alternating current and/or voltage of a required frequency.

other—a different and/or distinct entity and/or not the same as already mentioned and/or implied.

output—(n) something produced and/or generated; data produced by an information device executing machine-readable instructions; and/or the energy, power, work, signal, and/or information produced by a system. (v) to provide, produce, manufacture, and/or generate.

outwardly—toward an outer surface and/or circumference of packet—a generic term for a bundle of data organized in a specific way for transmission, such as within and/or across a network, such as a digital packet-switching network, and comprising the data to be transmitted and certain control information, such as a destination address.

pair—a quantity of two of something.

partially—to a degree, but not necessarily totally.

past—a time that has occurred.

perceptible—capable of being perceived by the human senses.

phase—a number of portions of a complete rotational cycle of a machine; a fraction of a complete cycle elapsed as measured from a specified reference point and often expressed as an angle; and/or a measure of an angular relationship between time-varying currents and voltages in an AC circuit.

physical—tangible, real, and/or actual.

physically—existing, happening, occurring, acting, and/or operating in a manner that is tangible, real, and/or actual.

physically separated—spaced apart.

plate—a flat rigid body.

plurality—the state of being plural and/or more than one.

portion—a part, component, section, percentage, ratio, and/or quantity that is less than a larger whole. Can be visually, physically, and/or virtually distinguishable and/or non-distinguishable.

position—(n) a place and/or location, often relative to a reference point. (v) to place and/or locate.

power—energy, a measure of energy and/or work, and/or a rate at which work is done, expressed as the amount of work per unit time and commonly measured in units such as watt and horsepower.

predetermined—established in advance.

prevent—to impede, hinder, stop, and/or keep from happening.

probability—a quantitative representation of a likelihood of an occurrence.

processor—a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

produce—to generate via a physical effort, manufacture, and/or make.

project—to calculate, estimate, or predict.

provide—to furnish, supply, give, convey, send, and/or make available.

proximity—the state, quality, sense, and/or fact of being near and/or next; the closeness of one thing to another.

pulse—a transient variation of a quantity (such as electric current or voltage) whose value is otherwise constant. Sometimes repeated with a regular period and/or according to some code.

pulse width modulated—encoded via variation of pulse widths radially—moving and/or directed along a radius.

radially distributed—located at equally spaced positions around a circumference of a circle.

receive—to gather, take, acquire, obtain, accept, get, and/or have bestowed upon.

recommend—to suggest, praise, commend, and/or endorse.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

report—a presentation of information in a predetermined format.

request—to express a desire for and/or ask for.

resistance—a measure of a voltage drop across a resistor, typically having units of Ohms.

responsive—reacting to an influence and/or impetus.

rotate—to turn about an axis.

rotating—turning about an axis.

rotation—an act or process of turning around a center or an axis.

rotational—about and/or around an axis.

rotational speed—a velocity at which an object turns around a center or an axis. A rotational speed can be expressed in terms of a number of revolutions in a given time period.

rotor—a rotating part of a machine.

said—when used in a system or device claim, an article indicating a subsequent claim term that has been previously introduced.

secure—to fasten, connect, and/or prevent substantial relative movement of.

select—to make a choice or selection from alternatives.

sender—a source of a transmission.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electro-magnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.

separated—not touching and/or spaced apart by something.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

shaft—a long, generally cylindrical bar that is adapted to rotate about a longitudinal axis and to transmit power.

shield—(n) a protective device or structure; (v) to cover up, conceal, and/or protect from, such as to protect from electromagnetic radiation and/or magnetic flux.

side—a surface bounding a solid object.

signal—automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that encode information, such as machine-implementable instructions for activities and/or one or more letters, words, characters, symbols, signal flags, visual displays, and/or special sounds, etc., having prearranged meaning Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

snugly—close-fitting and/or securely.

spacer—an object that defines and/or fills a gap.

spacing—a separation.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

speed—a linear, curviliear, and/or angular velocity and/or a linear, curviliear, and/or angular distance traveled during a predetermined time interval.

spiral—a path of a point in a plane moving around a central point while, on average, receding from or approaching it. When considering a spiral that generally recedes from the central point, for a given rotation about the central point, the spiral need not have a continuously increasing radius from the central point, however, each successive turn will have an increasing radius. Thus, a portion of a spiral can be linear and/or curvilinear.

stator—a stationary part in or about which another part (the rotor) revolves.

store—to place, hold, retain, enter, and/or copy into and/or onto a machine-readable medium.

sub-circuit—a portion of a circuit.

substantially—to a considerable, large, and/or great, but not necessarily whole and/or entire, extent and/or degree.

sufficient—to a degree necessary to achieve a predetermined result.

supply—make available for use.

support—to bear the weight of, especially from below.

surface—an outer boundary of an object or a material layer constituting or resembling such a boundary.

surround—to encircle, enclose, and/or confine on several and/or all sides.

switch—(n) a mechanical, electrical, and/or electronic device that opens and/or closes circuits, completes and/or breaks an electrical path, and/or selects paths and/or circuits and/or a device that establishes a connection between disparate transmission path segments in a network (or between networks). (v) to electrically energize or de-energize.

synchronously—having the same frequency, period, and/or phase.

system—a collection of devices, machines, articles of manufacture, and/or processes, the collection designed to perform one or more specific functions.

that—a pronoun used to indicate a thing as indicated, mentioned before, present, and/or well known.

thrust bearing—a bearing arranged to receive a thrust and/or longitudinal axially-directed force on a shaft.

touchdown—relating to contact between a rotor and a stator.

trace—an electrically conductive pathway and/or a communications connection typically formed from solder.

transform—to change in measurable: form, appearance, nature, and/or character.

transistor—a device that regulates current or voltage and acts as a switch or gate for electronic signals.

transmit—to provide, furnish, supply, send as a signal, and/or to convey (e.g., force, energy, and/or information) from one place and/or thing to another.

type—a number of things having in common traits or characteristics that distinguish them as a group or class.

uniformly—evenly.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

varies—changes over time.

via—by way of, with, and/or utilizing.

vibrate—to move back and forth or to and fro, especially rhythmically and/or rapidly.

voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wedge—an object comprising two substantially planar, substantially radial faces that are separated by an acute angle and are bounded by a substantially arcuate and/or planar face, and comprising an opposing pair of substantially parallel, substantially sector-shaped faces that are substantially perpendicular to the two substantially planar, substantially radial faces.

weight—a value indicative of importance.

wherein—in regard to which; and; and/or in addition to.

with respect to—in relation to.

within—inside.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) appearing in a claim is followed by a drawing element number, that drawing element number is exemplary and non-limiting on claim scope.

No claim of this document is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A machine, comprising:
    a rotating shaft configured to be driven by a motor;
    at least two magnetic radial bearings positionable axially from the motor and configured to magnetically levitate the rotating shaft, each of said at least two magnetic radial bearings comprising at least three stator magnet groups, each of said at least three stator magnet groups operatively coupled to a single respective controller and comprising at least three stator magnets that are substantially uniformly distributed around a longitudinal axis of said rotating shaft, no pair of said at least three stator magnets being separated by 180 degrees measured about said longitudinal axis, and each of said at least three stator magnet groups being operatively configured via electronic control by the single respective controller to fully support and position said rotating shaft utilizing a horizontal force and a vertical force and independently of each other stator magnet group of said at least three stator magnet groups.

2. The machine of claim 1, further comprising:
at least one magnetic thrust bearing configured to longitudinally position said rotating shaft, said at least one magnetic thrust bearing comprising at least three isolated thrust magnets.

3. The machine of claim 1, wherein each of said at least three stator magnet groups is associated with a communication channel.

4. The machine of claim 1, wherein:
said single respective controller is responsive to a frequency of an oscillator signal that varies according to a proximity of said rotating shaft to a position sensor associated with a stator magnet of said at least three stator magnet groups.

5. The machine of claim 1, wherein:
each of said at least three stator magnets is magnetically isolated.

6. The machine of claim 1, wherein:
each of said at least three stator magnets is secured to a non-magnetic housing via a non-magnetic wedge.

7. The machine of claim 1, wherein:
each of said at least three stator magnets is separated from each of other said at least three stator magnets via a non-magnetic wedge.

8. The machine of claim 1, further comprising:
at least one magnetic thrust bearing comprising at least three isolated thrust magnets.

9. The machine of claim 1, further comprising:
an eddy current position sensor associated with each of said at least three stator magnets.

10. The machine of claim 1, further comprising:
an eddy current position sensor associated with each of said at least three stator magnets, said eddy current position sensor comprising a spiral trace conductor configured to detect a position of said rotating shaft.

11. The machine of claim 1, further comprising:
an eddy current position sensor associated with each of said at least three stator magnets, said eddy current position sensor comprising an oscillator having an output that varies in frequency according to a proximity of said rotating shaft to said eddy current position sensor.

12. The machine of claim 1, wherein:
each of said at least three stator magnets is associated with a corresponding coil, said machine configured to estimate a resistance of each coil based on a measured coil current and a past voltage applied to said coil, and to determine a voltage to be delivered to said coil based on said resistance.

13. The machine of claim 1, wherein:
each of said at least three stator magnets is associated with a corresponding coil, and
responsive to a voltage applied to a predetermined coil exceeding a voltage capability of an amplifier corresponding to said predetermined coil, the single respective controller is configured to correct a phase of a flux of a stator magnet of said at least three stator magnets corresponding to said predetermined coil.

14. The machine of claim 1, wherein:
each of said single controllers is configured to adaptively apply corrections to a received position signal of said rotating shaft to attenuate a stator magnetic bearing-generated vibration that is transmitted synchronously with a rotational frequency of said rotating shaft and/or one or more harmonics of said rotational frequency.

15. The machine of claim 1, wherein:
each of said single controllers is configured to adaptively apply corrections to a magnetic bearing force to attenuate a stator magnetic bearing-generated vibration that is transmitted synchronously with a rotational frequency of said rotating shaft and/or one or more harmonics of said rotational frequency.

16. The machine of claim 1, wherein no pair of the stator magnets of all of the stator magnet groups are separated by 180 degrees measured about the longitudinal axis.

17. A machine, comprising:
a rotating shaft configured to be driven by a motor;
at least three distinct magnetic bearing control systems, each of said at least three distinct magnetic bearing control systems being independently and operatively configured to magnetically levitate and position the rotating shaft utilizing a horizontal force and a vertical force and independently of each other magnetic bearing control system of said at least three distinct magnetic bearing control systems, each of at least two of said at least three distinct magnetic bearing control systems comprising a stator radial magnet group corresponding to each of at least two magnetic radial bearings positionable axially from the motor, each of said stator radial magnet groups comprising at least three stator magnets substantially uniformly distributed around a longitudinal axis of said rotating shaft, and no pair of said at least three stator magnets from any of said at least two stator radial magnet groups being separated by 180 degrees measured about said longitudinal axis.

18. The machine of claim 17, wherein:
at least one of said at least three distinct magnetic control systems comprises at least two isolated thrust magnets configured to longitudinally position said rotating shaft.

19. A non-transitory machine-readable medium storing machine-implementable instructions for activities comprising:
via at least two magnetic radial bearings positionable axially from a motor, magnetically levitating a rotating shaft configured to be driven by the motor, each of said at least two magnetic radial bearings comprising at least three stator magnet groups, each of said at least three stator magnet groups operatively coupled to a single respective controller and comprising at least three stator magnets that are substantially uniformly distributed around a longitudinal axis of said rotating shaft, no pair of said at least three stator magnets being separated by 180 degrees measured about said longitudinal axis, and each of said at least three stator magnet groups being operatively configured via electronic control by the single respective controller to fully support and position said rotating shaft utilizing a horizontal force and a vertical force and independently of each other stator magnet group of said at least three stator magnet groups.

20. A system, comprising:
a circuit configured to, via at least two magnetic radial bearings positionable axially from a motor, magnetically levitate a rotating shaft configured to be driven by the motor, each of said at least two magnetic radial bearings comprising at least three stator magnet groups, each of at least three said stator magnet groups operatively coupled to a single respective controller and comprising at least three stator magnets that are substantially uniformly distributed around a longitudinal axis of said rotating shaft, no pair of said at least three stator magnets being separated by 180 degrees measured about said longitudinal axis, and each of said at least three stator magnet groups being operatively configured via electronic control by the single respective controller to fully support and position said rotating shaft utilizing a horizontal force and a vertical force and independently of each other stator magnet group of said at least three stator magnet groups.

* * * * *